US011420129B2

United States Patent
Summa et al.

(10) Patent No.: US 11,420,129 B2
(45) Date of Patent: Aug. 23, 2022

(54) GAMEPLAY EVENT DETECTION AND GAMEPLAY ENHANCEMENT OPERATIONS

(71) Applicant: Dell Products L.P., Round Rock, TX (US)

(72) Inventors: Erik Summa, Austin, TX (US); David Joseph Zavelson, Austin, TX (US); Marc Randall Hammons, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 227 days.

(21) Appl. No.: 16/777,161

(22) Filed: Jan. 30, 2020

(65) Prior Publication Data
US 2021/0236944 A1    Aug. 5, 2021

(51) Int. Cl.
| | | |
|---|---|---|
| *A63F 13/86* | (2014.01) | |
| *H04N 21/478* | (2011.01) | |
| *A63F 13/525* | (2014.01) | |
| *H04N 21/8545* | (2011.01) | |

(Continued)

(52) U.S. Cl.
CPC .......... *A63F 13/86* (2014.09); *A63F 13/525* (2014.09); *A63F 13/53* (2014.09); *H04N 21/4781* (2013.01); *H04N 21/8173* (2013.01); *H04N 21/8545* (2013.01)

(58) Field of Classification Search
CPC ......... A63F 13/86; A63F 13/525; A63F 13/52
See application file for complete search history.

(56) References Cited

U.S. PATENT DOCUMENTS

| | | |
|---|---|---|
| 8,190,760 B2 | 5/2012 | Hurst et al. |
| 9,919,207 B2 | 3/2018 | Brenden et al. |
| 10,335,690 B2 | 7/2019 | Schleicher |

(Continued)

OTHER PUBLICATIONS

Ringer et al. "Deep unsupervised multi-view detection of video game stream highlights", FDG '18: Proceedings of the 13th International Conference on the Foundations of Digital Games, Aug. 2018, Article No. 15, pp. 1-6, https://doi.org/10.1145/3235765.3235781.

(Continued)

*Primary Examiner* — Reginald A Renwick
(74) *Attorney, Agent, or Firm* — Norton Rose Fulbright US LLP

(57) ABSTRACT

Information handling systems, methods, and computer-readable media enable gameplay event detection and gameplay enhancement operations. One or more in-game events may be detected by monitoring audio content, by monitoring video content, by monitoring user input, by monitoring other information, or a combination thereof. The one or more in-game events (and information related to the one or more in-game events) may be stored at a database. Information of the database may be accessed to trigger one or more gameplay enhancement operations. The one or more gameplay enhancement operations may include an automatic highlight capture operation, a dynamic screen aggregation operation, a dynamic position switch operation, a dynamic player switch operation, a gameplay enhancement operation using one or more peripheral devices (e.g., a lighting effect or a haptic feedback event), one or more other gameplay enhancement operations, or a combination thereof.

20 Claims, 25 Drawing Sheets

(51) Int. Cl.
*A63F 13/53* (2014.01)
*H04N 21/81* (2011.01)

(56) References Cited

U.S. PATENT DOCUMENTS

| | | | |
|---|---|---|---|
| 2012/0225723 A1* | 9/2012 | Webster | A63F 13/795 |
| | | | 463/42 |
| 2014/0221087 A1* | 8/2014 | Huang | A63F 13/2145 |
| | | | 463/31 |
| 2015/0321098 A1 | 11/2015 | van der Laan et al. | |
| 2017/0228600 A1 | 8/2017 | Syed et al. | |
| 2018/0295175 A1 | 10/2018 | Smith et al. | |
| 2019/0118099 A1 | 4/2019 | Payzer et al. | |

OTHER PUBLICATIONS

Shield, NVIDIA "Support; FAQS", Jan. 2020, https://shield.nvidia.com/support/nvidia-grid/faq/1.

* cited by examiner

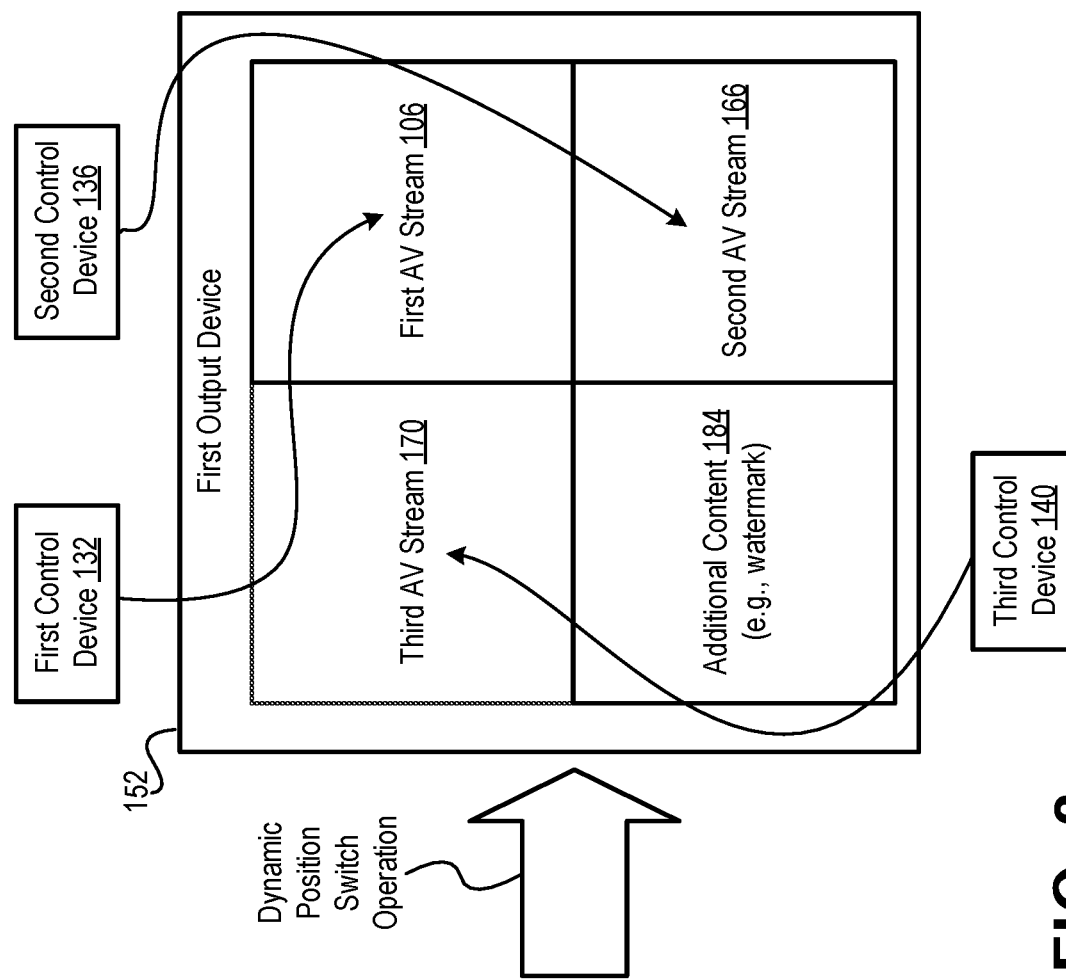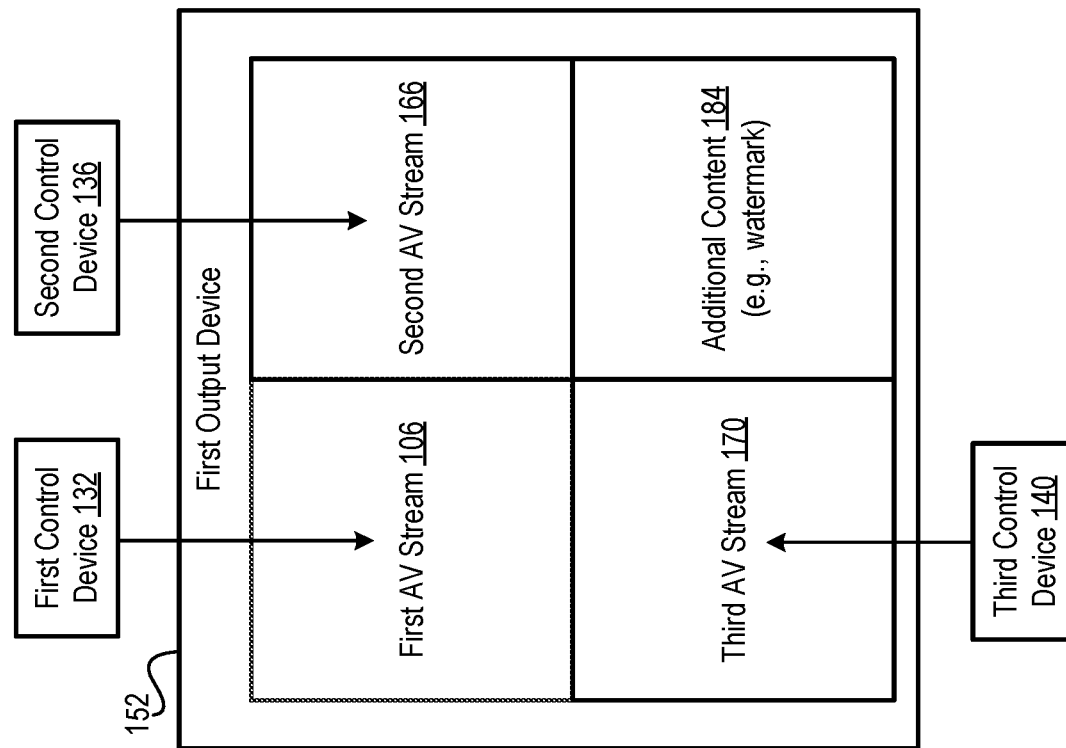
FIG. 3

```
┌─────────────────────────────────────────────────────────────────────────┐
│ Receive, by a device, a plurality of audio-visual (AV) streams          │
│ including a first AV stream and at least a second AV stream             │
└─────────────────────────────────────────────────────────────────────────┘
                                    │
                                    ▼
┌─────────────────────────────────────────────────────────────────────────┐
│ Output the plurality of AV streams from the device to an output device  │
│ for concurrent display using a first graphical arrangement of the       │
│ plurality of AV streams, wherein the first graphical arrangement        │
│ depicts the first AV stream using a first size and further depicts the  │
│ second AV stream using a second size                                    │
└─────────────────────────────────────────────────────────────────────────┘
                                    │
                                    ▼
┌─────────────────────────────────────────────────────────────────────────┐
│ Adjust, by the device, the concurrent display of the plurality of AV    │
│ streams from the first graphical arrangement to a second graphical      │
│ arrangement that depicts the first stream using an adjusted first size  │
│ different than the first size, that depicts the second stream using an  │
│ adjusted second size different than the second size, or a combination   │
│ thereof, where the adjusted first size is based, at least in part, on   │
│ a gameplay event metric associated with the first AV stream             │
└─────────────────────────────────────────────────────────────────────────┘
```

FIG. 10

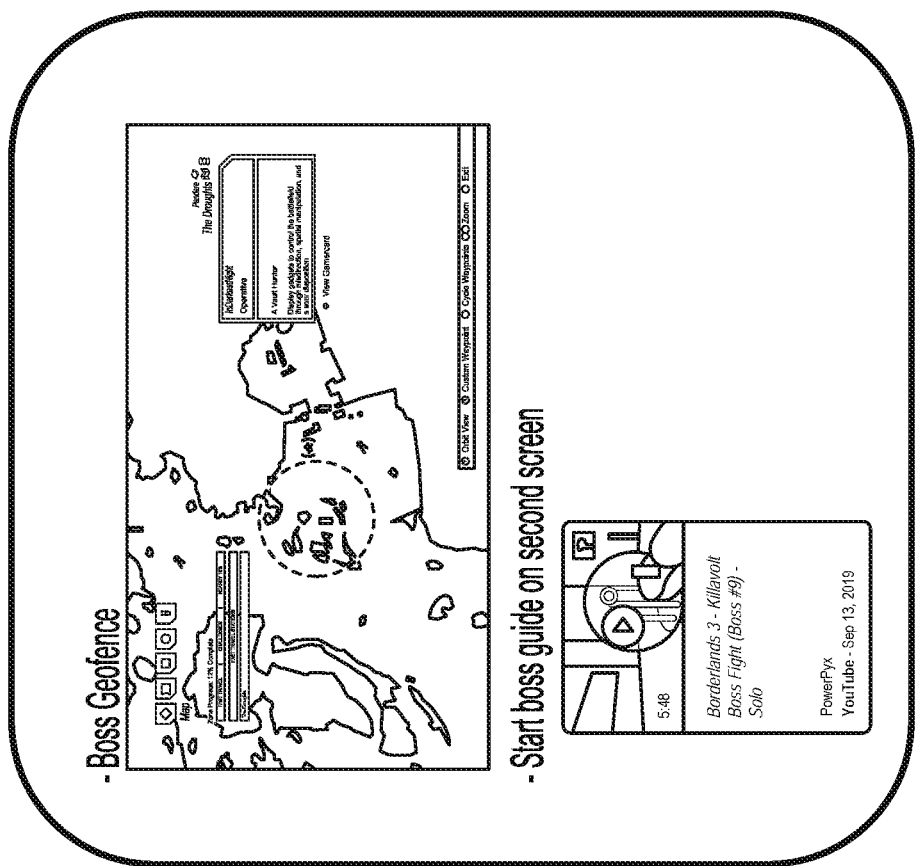
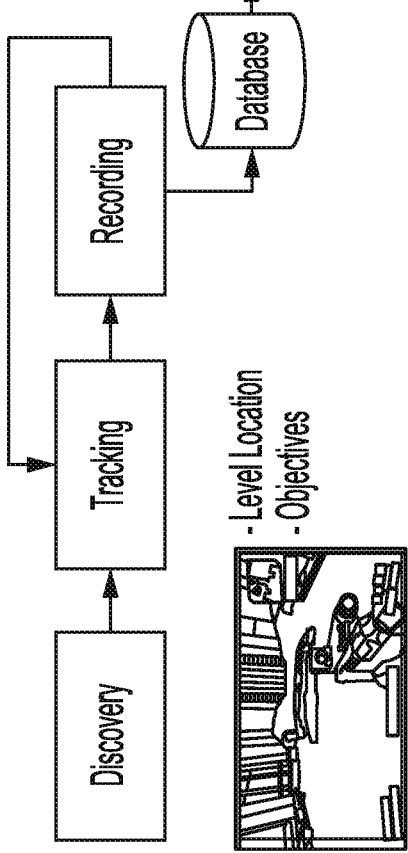
FIG. 19

Sample Contents

Event Source

| Audio | Video | Telemetry |
|---|---|---|
| Class | Class | Trend |
| Direction | Activity | Threshold |
| Intensity | Distance | Event |

Game State

| User State | Location | Objectives | Friendlies | Enemies |
|---|---|---|---|---|
| Class | Position | Type | Count | Count |
| Activity | Viewpoint | Status | Type | Type |
| Vitals | | | Vitals | Vitals |

User Reaction

| Focus | Motion | Action | Sentiment |
|---|---|---|---|
| Viewpoint | Towards | Keys | Chat/Voice |
| Gaze | Away | Sequences | Latency |
| Mouse | Ignore | Frequency | Intensity |

FIG. 24

GAMEPLAY EVENT DETECTION AND GAMEPLAY ENHANCEMENT OPERATIONS

FIELD OF THE DISCLOSURE

The instant disclosure relates to information handling systems that execute video game applications. More specifically, portions of this disclosure relate to gameplay event detection and gameplay enhancement operations in connection with information handling systems that execute video game applications.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include computing devices that execute video game applications. For example, a desktop computer, a laptop computer, a tablet, a mobile device, a server, or a gaming console may each execute a video game application. Video game applications include single-user video games and multi-user video games (e.g., where multiple players compete with or cooperate with one another).

With increased speed and range of communication networks, video games are increasingly interactive. For example, gameplay of one user can be streamed to thousands of viewers, who may be located in various countries. In some cases, the user may capture certain gameplay footage, edit the footage, and upload the edited footage to a content server for viewing. Capturing, editing, and uploading the footage may be time consuming, particularly for users who log many hours of video game playing (and may need to analyze many hours of gameplay footage to find certain content that is to be uploaded to a content server). Further, editing of the footage may involve purchasing and learning to use complicated video editing software.

In addition, certain video games offer enhancement operations during gameplay to supplement or enhance gameplay experience. For example, a software developer of a video game application may insert a set of instructions (e.g., a software "hook") executable to control peripheral devices or other equipment (e.g., to trigger a lighting effect in response to a certain game event). Coding a "hook" that is compatible with many different hardware types may be difficult, time consuming, or infeasible in some cases. Further, some video game developers may be inexperienced in such coding. As a result, many video games do not offer game enhancement operations.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

Methods, information handling systems, and computer-readable media that improve gameplay experience are disclosed. In one aspect of the disclosure, gameplay clips (e.g., highlights) are captured automatically based on gameplay metrics associated with a video game. The gameplay metrics may be based on a count of in-game events detected during gameplay by analyzing an audio-visual (AV) stream of the video game. The in-game events may be detected based on input/output (I/O) telemetry (e.g., rapid keystrokes), voice-based indicators (e.g., a comment made by a player of the video game), video-based indicators in the AV stream, audio-based indicators in the AV stream, biometric indicators associated with a player of the video game, other information, or a combination thereof. By analyzing one or more input streams (e.g., an AV stream, an I/O stream, one or more other streams, or a combination thereof) to detect in-game events, gameplay footage may be automatically identified and captured, reducing the need for users to capture and edit footage (e.g., using complicated video editing software).

Further, the gameplay metrics can be used as a basis for performing other operations. In one example, the gameplay metrics may be used to trigger a resizing operation that changes the relative sizing of AV streams presented on a display device (e.g., by increasing the size of an AV stream associated with more exciting gameplay). In additional examples, one or more other gameplay features can be changed, such as the positions of the AV streams, the assignment of players to the AV streams (e.g., by changing which player controls a certain character), or lighting associated with each AV stream (e.g., by matching a border of an AV stream associated with a user to a color of LED lighting at a controller of the user).

In one aspect of the disclosure, one or more channels of audio data of an AV stream are analyzed to detect one or more in-game events. In some examples, the one or more in-game events are used to trigger one or more gaming enhancement operations, such as a lighting effect, a haptic feedback effect, or another operation. In another aspect of the disclosure, video data of the AV stream is analyzed to detect the one or more in-game events, such as by analyzing a heads-up display (HUD) of the AV stream. In an additional aspect of the disclosure, user input telemetry data is collected and analyzed to create gameplay assistance for game players. For example, a database may be populated with user input telemetry data and used to offer the gameplay assistance to game players.

Although certain aspects of the disclosure are described separately for convenience, it is noted that the aspects can be combined without departing from the scope of the disclosure. To illustrate, one or more in-game events may be detected by monitoring audio content, by monitoring video content, by monitoring user input, by monitoring other information, or a combination thereof. The one or more in-game events (and information related to the one or more in-game events) may be stored at a database. Information of the database may be accessed to trigger one or more gameplay enhancement operations. The one or more gameplay enhancement operations may include an automatic highlight capture operation, a dynamic screen aggregation operation, a dynamic position switch operation, a dynamic player switch operation, a gameplay enhancement operation using one or more peripheral devices (e.g., a lighting effect or a haptic feedback event), one or more other gameplay enhancement operations, or a combination thereof.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

FIG. 3 illustrates an example of a dynamic position switch operation in accordance with some aspects of the disclosure.

FIG. 10 illustrates an additional example of a method that may be performed by a device in accordance with some aspects of the disclosure.

FIG. 19 illustrates additional examples of operations that may be performed by a device in accordance with some aspects of the disclosure.

FIG. 24 illustrates examples of content that may be stored in a database in accordance with some aspects of the disclosure.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Certain examples of information handling systems are described further below, such as with reference to FIG. 1.

Figure 1:
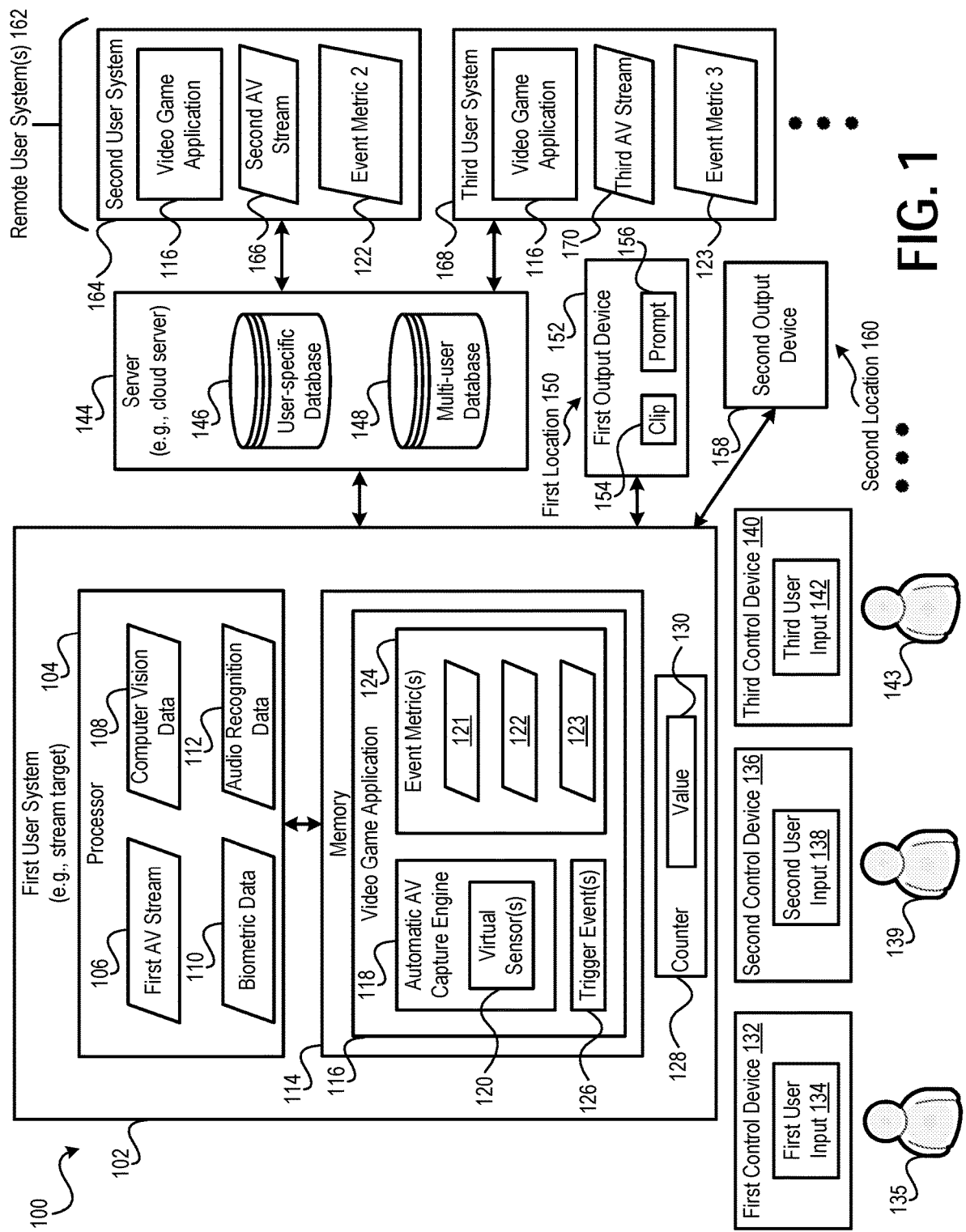
FIG. 1 illustrates an example of a system in accordance with some aspects of the disclosure.

FIG. 1 depicts an example of a system 100. The system 100 includes multiple user systems, such as a first user system 102 and one or more remote user systems 162. In the example of FIG. 1, the one or more remote user systems 162 include a second user system 164 and a third user system 168. The user systems 102, 164, and 168 may each include a desktop computer, a laptop computer, a tablet, a mobile device, a server, or a gaming console, as illustrative examples. In one example, the first user system 102 is remotely coupled to the one or more remote user systems 162 via a network. The network may include a local area network (LAN), a wide area network (WAN), a wireless network (e.g., a cellular network), a wired network, the Internet, one or more other networks, or a combination thereof.

The system 100 may further include a server 144 (e.g., a cloud server). Although the server 144 is described as a single device, in some implementations, functionalities of the server 144 may be implemented using multiple servers. The server 144 may be coupled to the first user system 102 and to the one or more remote user systems 162 via one or more networks, such as a local area network (LAN), a wide area network (WAN), a wireless network (e.g., a cellular network), a wired network, the Internet, one or more other networks, or a combination thereof.

The system 100 may further include one or more control devices, such as a first control device 132, a second control device 136, and a third control device 140. As one example, the first control device 132 includes a first video game controller, the second control device 136 includes a second video controller, and the third control device 140 includes a third video game controller. The first control device 132, the second control device 136, and the third control device 140 may be configured to communicate with one or more other devices of the system 100 via a wireless interface or a wired interface.

Each device of FIG. 1 may include one or more memories configured to store instructions and may further include one or more processors configured to execute instructions to carry out operations described herein. To illustrate, in the example of FIG. 1, the first user system 102 includes a processor 104 and a memory 114.

The system 100 may further include one or more output devices, such as a first output device 152 and a second output device 158. In one example, the first output device 152 includes a first display device (e.g., a first television display or a first computer monitor), and the second output device 158 includes a second display device (e.g., a second television display or a second computer monitor). In one possible configuration, the first output device 152 is in a first location 150 (e.g., a first room), and the second output device 158 is in a second location 160 (e.g., a second room different than the first room). The first output device 152 and the second output device 158 may each be coupled to the first user system 102 via a wired connection or via a wireless connection.

It will be appreciated that the examples described with reference to FIG. 1 are illustrative and that other examples are also within the scope of the disclosure. For example, although three control devices are illustrated, in other examples, more than or fewer than three control devices may be used. As another example, although FIG. 1 depicts two output devices, in other examples, the system 100 may include more than or fewer than two output devices. As an additional example, although two remote user systems are illustrated, in other examples, more than or fewer than two remote user systems may be used. As a further example, one or more of the video game applications 116 may execute on the server 144 to generate AV streams that are transmitted to one or more of the user systems 102, 164, and 168.

During operation, one or more devices of FIG. 1 may execute a video game application 116 or another application generating an audio-visual (AV) stream. For example, the processor 104 of the first user system 102 may retrieve the video game application 116 from the memory 114 and may execute the video game application 116 to generate a first AV stream 106. The second user system 164 may execute the video game application 116 to generate a second AV stream 166, and the third user system 168 may execute the video game application 116 to generate a second AV stream 166.

As used herein, an "AV stream" may refer to a signal transmitted wirelessly or using a wired connection. In addition, as used herein, an "AV stream" may refer to a digital signal or an analog signal. Further, as used herein, an "AV stream" may refer to a representation of content for an audio/video display. Examples of "AV streams" include a display signal, such as a component video signal or an HDMI signal. Other examples of "AV streams" include a data signal, such as a data stream defining shapes or objects that can be modified (e.g., rendered) to generate a signal to be input to a display device (or other output device). Further, although certain examples are provided with reference to three AV streams, it is noted that aspects of the disclosure are applicable to more than three AV streams (e.g., four or five AV streams) or fewer than three AV streams, such as two AV streams (or one AV stream in some cases).

In some examples, the video game application 116 is a multi-user video game application that enables gameplay by multiple users, such as a first user 135 associated with the first control device 132, a second user 139 associated with the second control device 136, and a third user 143 associated with the third control device 140. In this example, the first control device 132 may receive first user input 134 from the first user 135 and may provide the first user input 134 (or other input) to the first user system 102 to control one or more aspects of the first AV stream 106 (e.g., to control a first character of the video game application 116 that is depicted in the first AV stream 106). The second control device 136 may receive second user input 138 from the second user 139 and may provide the second user input 138 (or other input) to the second user system 164 to control one or more aspects of the second AV stream 166 (e.g., to control a second character of the video game application 116 that is depicted in the second AV stream 166). The third control device 140 may receive third user input 142 from the third user 143 and may provide the third user input 142 (or other input) to the third user system 168 to control one or more aspects of the third AV stream 170 (e.g., to control a third character of the video game application 116 that is depicted in the third AV stream 170).

In some gameplay scenarios, players are located at a common site (e.g., a game party), and one or more players provide user input (e.g., "cast") to a remote (or off-site) user system (e.g., due to particular capabilities of the remote user system or due to the particular preferences of the player). An on-site user system may be referred to herein as a "stream target." To further illustrate, in FIG. 1, the first user system 102 may correspond to a stream target. The second user system 164 may be remotely connected to the first user system 102 and to the second control device 136, and the third user system 168 may be remotely connected to the first user system 102 and to the third control device 140. In this example, the first user system 102 may receive the first user input 134 via a local connection with the first control device 132, and the second user system 164 and the third user system 168 may receive the second user input 138 and the third user input 142 via a remote connection with the second control device 136 and the third control device 140, respectively. The local connection may include a wired connection or a LAN, and the remote connection may include the Internet, as non-limiting illustrative examples.

In some examples, the second AV stream 166 and the third AV stream 170 are provided to a device of the system 100, such as the first user system 102 or the first output device 152. In some examples, the second AV stream 166 and the third AV stream 170 are provided from the second user system 164 and the third user system 168, respectively, to the device using a streaming protocol, such as a real-time transport protocol (RTP). In some examples, the first user system 102 is configured to receive the AV streams 166, 170 and to combine the AV streams 106, 166, and 170 to generate a composite AV stream that is presented concurrently on a display of the first output device 152 (e.g., in connection with a game party).

In accordance with certain aspects of the disclosure, one or more devices of the system 100 are configured to automatically capture one or more clips (e.g., highlights) during gameplay of the video game application 116. To illustrate, in some aspects of the disclosure, the video game application 116 includes an automatic AV capture engine 118 that is executable to monitor data for a plurality of trigger events, to detect one or more of the plurality of trigger events (e.g., by detecting one or more trigger events 126), and to capture one or more clips (e.g., highlights) based on the one or more detected trigger events. The monitored data may include one or more of computer vision data 108, biometric data 110, audio recognition data 112, or other data, as illustrative examples.

The automatic AV capture engine 118 may be configured to monitor one or more aspects of an AV stream to detect the one or more trigger events 126. To illustrate, in some examples, the automatic AV capture engine 118 is configured to monitor the first AV stream 106 for one or more video-based indicators. The one or more video-based indicators may include a change in contrast of the first AV stream 106 that satisfies a contrast threshold, a velocity of a character or vehicle depicted in the first AV stream 106 that satisfies a velocity threshold, a magnitude of motion vectors used for encoding the first AV stream 106, or another type of movement associated with the first AV stream 106, as illustrative examples. In some examples, the automatic AV capture engine 118 is configured to generate the computer vision data 108 based on the first AV stream 106 (e.g., using a computer vision image recognition technique) and to analyze the computer vision data 108 for the one or more video-based indicators.

The automatic AV capture engine 118 may be configured to monitor an AV stream for one or more audio indicators to detect the one or more trigger events 126. The one or more audio indicators may correspond to certain noises indicated by the first AV stream 106, such as explosions, gunfire, or sound effects associated with scoring, as illustrative examples. In some examples, the automatic AV capture engine 118 is configured to generate the audio recognition data 112 based on the first AV stream 106 (e.g., using an audio recognition technique) and to analyze the audio recognition data 112 for the one or more audio-based indicators.

The automatic AV capture engine 118 may be configured to monitor gameplay telemetry associated with an AV stream for one or more gameplay telemetry indicators to detect the one or more trigger events 126. For example, the automatic AV capture engine 118 may be configured to monitor the first AV stream 106 for an indication of a game stage having a difficulty that satisfies (e.g., is greater than, or is greater than or equal to) a difficulty threshold (e.g., a boss level), for an indication of a number of kills that satisfies a kill threshold, for an indication of a number of level-ups that satisfies a level-up threshold, or for an indication of a bonus, as illustrative examples.

The automatic AV capture engine 118 may be configured to monitor for one or more object-based indicators included in the first AV stream 106 to detect the one or more trigger events 126. The one or more object-based indicators may include an object or item of interest depicted in the first AV stream 106, such as an indication that a character health-level fails to satisfy (e.g., is less than, or is less than or equal to) a health-level threshold, text indicating that a character is victorious during gameplay, a kill count, or an indication of a boss, as illustrative examples.

Alternatively or in addition to monitoring an AV stream, the automatic AV capture engine 118 may be configured to monitor one or more other data sources to identify the one or more trigger events 126. To illustrate, in some examples, the automatic AV capture engine 118 is configured to monitor input/output telemetry data associated with the first user input 134 to detect the one or more trigger events 126. In some examples, the one or more trigger events 126 indicate a threshold I/O rate, such as a threshold rate of keystrokes of the first user input 134, a threshold rate of mouse movements of the first user input 134, a threshold rate of mouse clicks of the first user input 134, or a threshold rate of button presses of the first user input 134, as illustrative examples. In this example, in response to detecting that the I/O telemetry data satisfies the threshold I/O rate, the first user system 102 may detect the one or more trigger events 126.

The automatic AV capture engine 118 may be configured to monitor ambient sound for sound-based indicators to detect the one or more trigger events 126. The ambient sound may include speech from the first user 135 (e.g., speech detected using a microphone of a headset worn by the first user 135 during gameplay) or sound recorded at a location of the first user 135 (e.g., sound detected using a room microphone included in or coupled to the first user system 102). The sound-based indicators may include one or more utterances (e.g., a gasp, an exclamation, or a certain word), cheering, clapping, or other sounds, as illustrative examples.

The automatic AV capture engine 118 may be configured to monitor for one or more commentary-based indicators to detect the one or more trigger events 126. To illustrate, in some examples, the users 135, 139, and 143 may exchange commentary during gameplay, such as social media messages, chat messages, or text messages. In some examples, the first user system 102 is configured to receive commentary indicated by the first user input 134 and to send a message indicating the commentary to the server 144 (e.g., to post the commentary to a social media site or to send the commentary to the users 139, 143 via one or more chat messages or via one or more text messages). The automatic AV capture engine 118 may be configured to monitor the commentary for one or more keywords or phrases indicative of excitement or challenge, as illustrative examples.

The automatic AV capture engine 118 may be configured to monitor the biometric data 110 for one or more biometric indicators to detect the one or more trigger events 126. In some examples, the biometric data 110 is generated by a wearable device (e.g., a smart watch or other device) that is worn by the first user 135 that sends the biometric data 110 to the first user system 102. The one or more biometric indicators may include a heart rate of the first user 135 that satisfies a heart rate threshold, a respiratory rate of the first user 135 that satisfies a respiratory rate threshold, a change in pupil size (e.g., pupil dilation) of the first user 135 that satisfies a pupil size change threshold, or an eye movement of the first user 135 that satisfies an eye movement threshold, as illustrative examples. In some implementations, the biometric data 110 includes electrocardiogram (ECG) data, electroencephalogram (EEG) data, other data, or a combination thereof.

The automatic AV capture engine 118 may be configured to monitor room events for one or more room event indicators to detect the one or more trigger events 126. The one or more room event indicators may include a change in ambient lighting, for example. In some examples, the first user system 102 includes or is coupled to a camera having a lighting sensor configured to detect an amount of ambient lighting.

The automatic AV capture engine 118 may include one or more virtual sensors 120 configured to detect the one or more trigger events 126. In some implementations, the one or more virtual sensors 120 include instructions (e.g., "plug-ins") executable by the processor 104 to compare samples of data (e.g., the computer vision data 108, the biometric data 110, the audio recognition data 112, other data, or a combination thereof) to reference samples (e.g., signatures of trigger events) indicated by the virtual sensors 120. The automatic AV capture engine 118 may be configured to detect a trigger event of the one or more trigger events 126 in response to detecting that a sample of the data matches a reference sample indicated by the one or more virtual sensors 120. The automatic AV capture engine 118 may be configured to check for conditions specified by the one or more virtual sensors 120 based on a configurable poll rate.

The automatic AV capture engine 118 may be configured to automatically capture a portion of an AV stream based on detection of the one or more trigger events 126. As an example, in response to detection of the one or more trigger events 126, the automatic AV capture engine 118 may capture a clip 154 (e.g., a "greatest hit") of the first AV stream 106. In one example, the first AV stream 106 is buffered at a memory (e.g., an output buffer) prior to being provided to the first output device 152, and the capture of the clip 154 is initiated at a certain portion of the memory in response to detection of the one or more trigger events 126. Capture of the clip 154 may be terminated in response to one or more conditions. For example, capture of the clip 154 may be terminated after a certain duration of recording. In another example, capture of the clip 154 may be terminated in response to another event, such as a threshold time period during which no other trigger events 126 are detected. The clip 154 may be stored to the memory 114 and/or sent to another device, such as to the server 144.

The automatic AV capture engine 118 may be configured to automatically capture the clip 154 based on the one or more trigger events 126 satisfying a threshold number of events, based on a time interval, or a combination thereof. To illustrate, the automatic AV capture engine 118 may be configured to monitor for the one or more trigger events 126 during the time interval (e.g., 5 seconds, as an illustrative example). The automatic AV capture engine 118 may be configured to increment, during the time interval, a value 130 of a counter 128 (e.g., a software counter or a hardware counter) in response to each detected trigger event of the one or more trigger events 126. If the value 130 of the counter 128 satisfies the threshold number of events during the time interval, the automatic AV capture engine 118 may automatically capture the clip 154. Alternatively, if the value 130 of the counter 128 fails to reach the threshold number of events during the time interval, the automatic AV capture engine 118 may reset the value 130 of the counter 128 (e.g., upon expiration of the threshold time interval).

The clip 154 may be presented (e.g., via the first output device 152) with a prompt 156 to save (or delete) the clip 154. For example, upon termination of gameplay or upon completion of a game stage, the clip 154 may be presented to the first user 135 with the prompt 156. In another example, the clip 154 can be presented at the first output device 152 during gameplay (e.g., using a split-screen technique) so that the first user 135 can review the clip 154 soon after capture of the clip 154. In some examples, the clip 154 is stored to (or retained at) the memory 114 or the server 144 in response to user input via the prompt 156. Alternatively, the clip 154 may be deleted, invalidated, or overwritten from the memory 114 or the server 144 in response to user input via the prompt 156.

Alternatively or in addition, the prompt 156 may enable a user to edit or share the clip 154. For example, the prompt 156 may enable the first user 135 to trim the clip 154 or to apply a filter to the clip 154. Alternatively or in addition, the prompt 156 may enable the first user 135 to upload the clip 154 to a social media platform or to send the clip 154 via a text message or email, as illustrative examples.

In accordance with certain aspects of the disclosure, one or more devices of the system 100 are configured to determine one or more gameplay metrics 124 associated with gameplay of the video game application 116. In the example of FIG. 1, the one or more gameplay metrics 124 include a first gameplay metric 121 associated with the first user 135, a second gameplay metric 122 associated with the second user 139, and a third gameplay metric 123 associated with the third user 143. The one or more gameplay metrics 124 may be determined based on data used to detect the one or more trigger events 126, such as based on the computer vision data 108, the biometric data 110, the audio recognition data 112, other data, or a combination thereof.

To illustrate, in some examples, the computer vision data 108 indicates one or more achievements (e.g., a score) of the first user 135 in connection with the video game application 116. The one or more achievements may be detected using one or more techniques described herein, such as by analyzing the first AV stream 106 or by analyzing external events, such as ambient sound or room lighting. In some implementations, the first user system 102 is configured to execute the video game application 116 to determine the first gameplay metric 121, the second user system 164 is configured to execute the video game application 116 to determine the second gameplay metric 122, and the third user system 168 is configured to execute the video game application 116 to determine the third gameplay metric 123.

To further illustrate, in some implementations, each event or indicator described with reference to the one or more trigger events 126 is associated with a value, and the automatic AV capture engine 118 is configured to add values associated with each trigger event detected during a certain time interval to determine a gameplay metric. In an illustrative example, the first gameplay metric 121 may correspond to (or may be based at least in part on) the value 130 of the counter 128.

In accordance with some aspects of the disclosure, the one or more gameplay metrics 124 are used to determine an arrangement of the AV streams 106, 166, and 170 at an output device, such as the first output device 152. In one illustrative example, the second user system 164 and the third user system 168 send the second gameplay metric 122 and the third gameplay metric 123, respectively, to the first user system 102, and the video game application 116 is executable by the processor 104 to resize one or more of the AV streams 106, 166, and 170 based on the gameplay metrics 121, 122, and 123.

Figure 2:
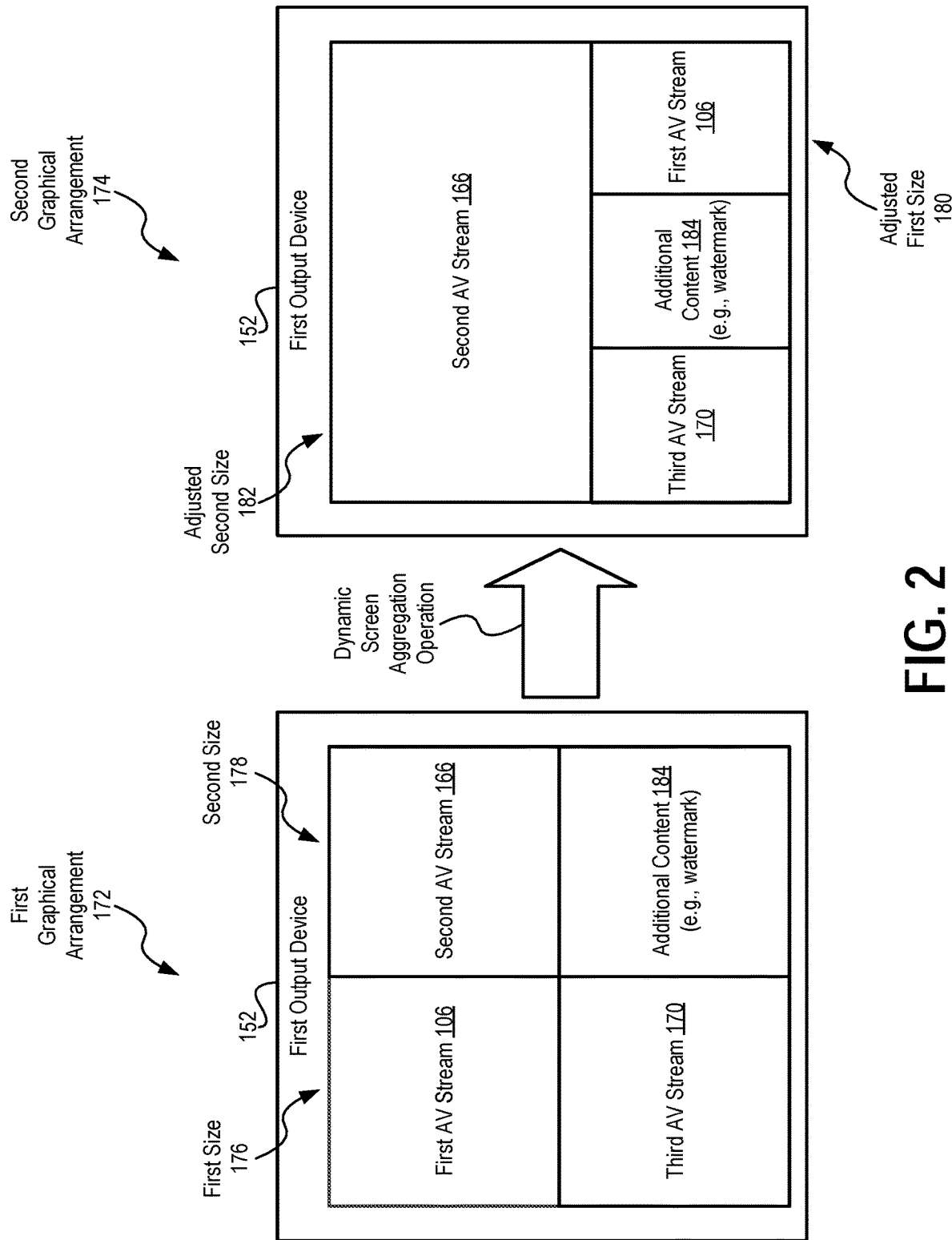
FIG. 2 illustrates an example of a dynamic screen aggregation operation in accordance with some aspects of the disclosure.

To further illustrate, FIG. 2 depicts an illustrative example of a dynamic screen aggregation operation to modify concurrent display of the AV streams 106, 166, and 170 from a first graphical arrangement 172 to a second graphical arrangement 174. The first graphical arrangement 172 includes the AV streams 106, 166, and 170 and additional content 184. In some examples, the additional content 184 includes one or more of an advertisement or a watermark, such as a brand logo associated with the video game application 116. Alternatively or in addition, recent highlights (e.g., the clip 154) can be displayed as the additional content 184.

In the first graphical arrangement 172, the first AV stream 106 has a first size 176, and the second AV stream 166 has a second size 178. In one example, the first size 176 corresponds to the second size 178. In one example, upon starting gameplay, sizes of each of the AV streams 106, 166, and 170 and the additional content 184 may be set to a default size. The AV streams 106, 166, and 170 may correspond to different video games or a common video game. Further, the AV streams 106, 166, and 170 may be generated by different devices (e.g., by the user systems 102, 164, and 168 of FIG. 1) or by a common device (e.g., by the first user system 102).

During gameplay, the first graphical arrangement 172 may be changed to the second graphical arrangement 174 based on one or more criteria. In one example, the first graphical arrangement 172 is changed to the second graphical arrangement 174 based on the one or more gameplay metrics 124 (e.g., where a better performing user is allocated more screen size as compared to a worse performing user). For example, if the gameplay metrics 121, 122 indicate that the second user 139 is performing better than the first user 135, then the first size 176 may be decreased to an adjusted first size 180, and the second size 178 may be increased to the adjusted second size 182.

To further illustrate, in one example, the first user system 102 is configured to determine screen sizes based on a pro rata basis. For example, the first user system 102 may be configured to add the gameplay metrics 121, 122, and 123 to determine a composite metric and to divide the composite metric by the first gameplay metric 121 to determine the adjusted first size 176. The first user system 102 may be configured to divide the composite metric by the second gameplay metric 122 to determine the adjusted second size 182.

In some implementations, the gameplay metrics 121, 122, and 123 can be recomputed periodically, and the dynamic screen aggregation operation of FIG. 2 can be performed on a periodic basis (e.g., with each computation of the gameplay metrics 121, 122, and 123. Alternatively or in addition, the dynamic screen aggregation operation of FIG. 2 can be performed based on one or more other conditions. As an example, the dynamic screen aggregation operation of FIG. 2 can be performed in response to a change in one of the gameplay metrics 121, 122, and 123 that satisfies a threshold.

Alternatively or in addition to performing a dynamic screen aggregation operation, in some implementations, a dynamic position switch operation may be performed to change positions of any of the AV streams 106, 166, and 170 and the additional content 184. For example, in FIG. 2, a first position of the first AV stream 106, a second position of the second AV stream 166, a third position of the third AV stream 170, and a fourth position of the additional content 184 have been modified in the second graphical arrangement 174 relative to the first graphical arrangement 172.

FIG. 3 depicts an example of a dynamic position switch operation. In FIG. 3, positions of the AV streams 106, 166, and 170 and the additional content 184 are modified based on one or more criteria. For example, the positions of the AV streams 106, 166, and 170 and the additional content 184 may be modified according to a timer (e.g., where the positions are randomly selected according to the timer, such as every 30 seconds). In another example, each position may be associated with a ranking (e.g., where the top left position is associated with a top performer), and the AV streams 106, 166, and 170 may be assigned to the positions according to the gameplay metrics 121, 122, and 123.

Figure 4:
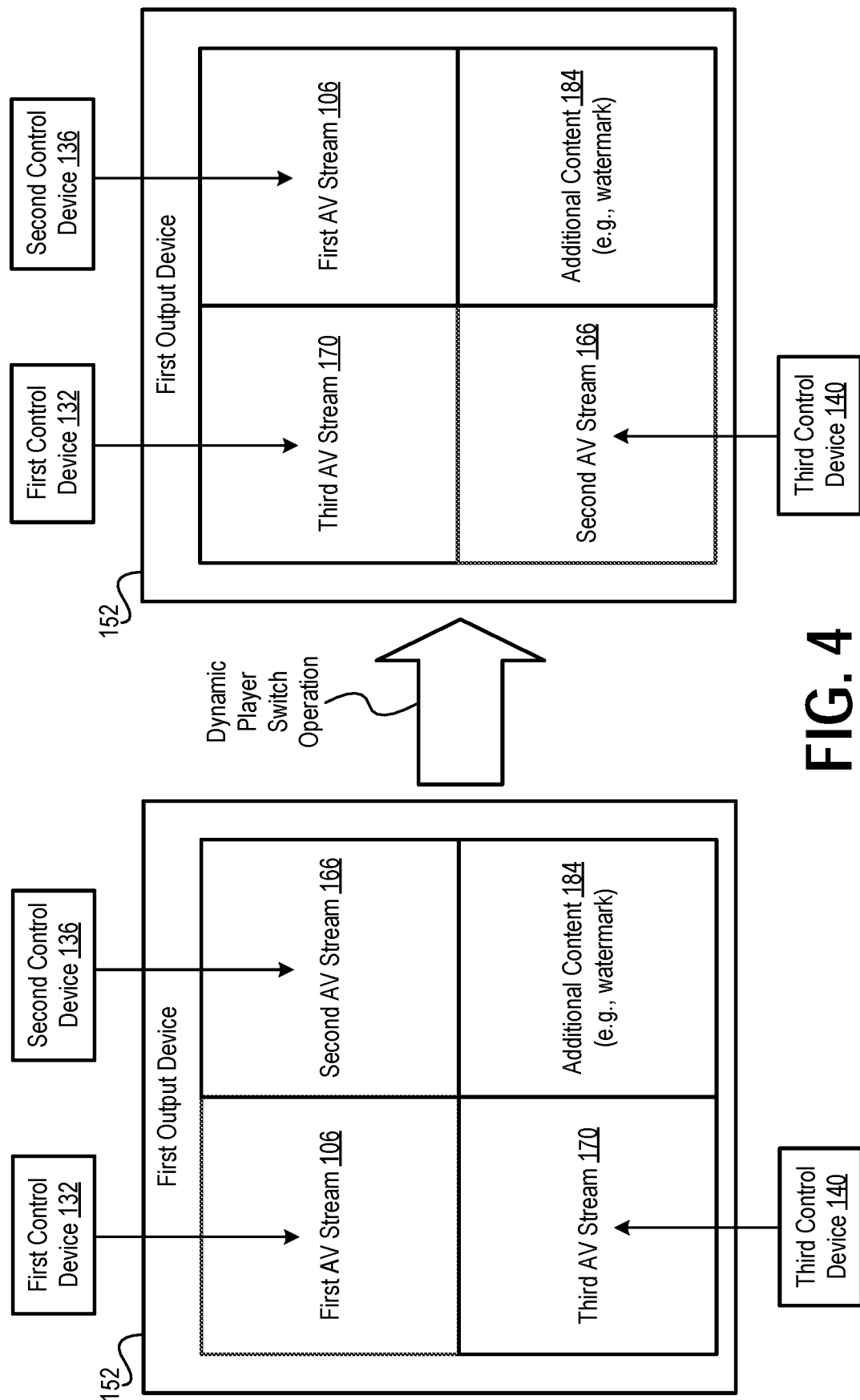
FIG. 4 illustrates an example of a dynamic player switch in accordance with some aspects of the disclosure.

In some implementations, assignment of the control devices 132, 136, and 140 to the AV streams 106, 166, and 170 can be dynamically modified. FIG. 4 depicts one example of a dynamic player switch operation. Control of the first AV stream 106 may be reassigned from the first control device 132 to the second control device 136. In this case, the second user 139 assumes control of gameplay from the first user 135. The example of FIG. 4 also illustrates that control of the second AV stream 166 is reassigned from the second control device 136 to the third control device 140 and that control of the third AV stream 170 is reassigned from the third control device 140 to the first control device 132. In this example, the third user 143 assumes control of gameplay from the second user 139, and the first user 135 assumes control of gameplay from the third user 143.

In some examples, the first user system 102 of FIG. 1 is configured to perform the dynamic player switch operation of FIG. 4 based on one or more criteria. In one example, the first user system 102 is configured to perform the dynamic player switch operation randomly or pseudo-randomly. Alternatively or in addition, the first user system 102 may be configured to perform the dynamic player switch operation based on a schedule, such as every 30 seconds or every minute. By performing the dynamic player switch operation of FIG. 4, a user may need to identify which AV stream the user controls, which may add challenge to a multiplayer video game.

Figure 5:
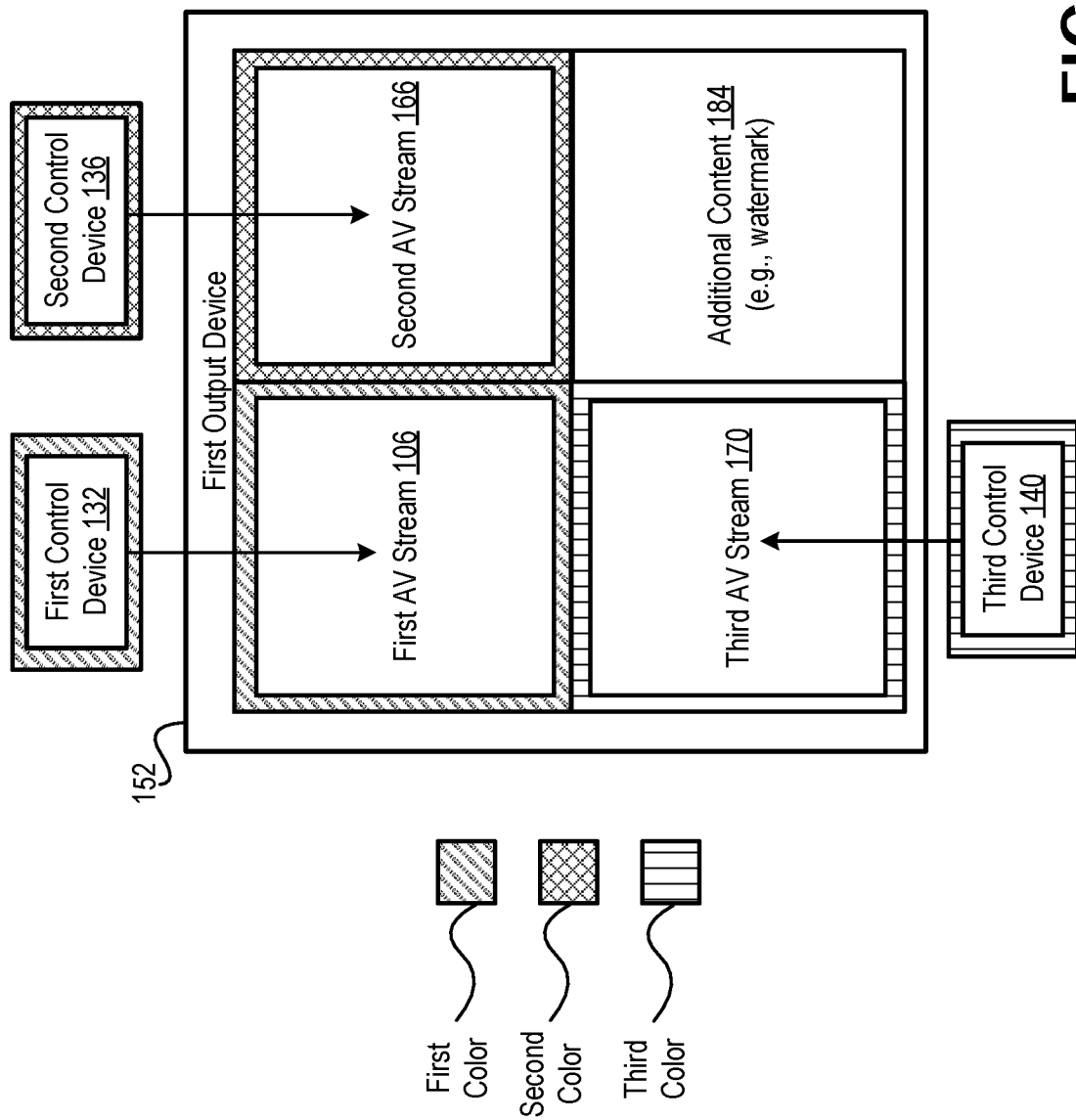
FIG. 5 illustrates an example of a lighting effect in accordance with some aspects of the disclosure.

FIG. 5 illustrates another aspect of the disclosure. In FIG. 5, the first AV stream 106 is presented at the first output device 152 using a border having a first color. FIG. 5 also illustrates that the second AV stream 166 is presented at the first output device 152 using a border having a second color. In FIG. 5, the third AV stream 170 is presented at the first output device 152 using a border having a third color.

In one example, the first user system 102 of FIG. 1 is configured to trigger lighting events at the control devices 132, 136, and 140. For example, the first user system 102 may be configured to indicate the first color to the first control device 132, to indicate the second color to the second control device 136, and to indicate the third color to the third control device 140. The indications may trigger lighting events at the control devices 132, 136, and 140. For example, the first control device 132 may include a first set lighting devices (e.g., light emitting diodes (LEDs)) that generate a certain color based on an indication provided by the first user system 102.

In some implementations, lighting events triggered at the control devices 132, 136, and 140 match colors presented at the first output device 152. For example, in connection with the dynamic position switch operation of FIG. 3, the first user system 102 may indicate that the first control device 132 is to change from generating the first color to generating the second color (e.g., to indicate that the first AV stream 106 has moved from the upper-left of the first output device 152 to the upper-right of the first output device 152). In some cases, triggering lighting events in accordance with one or more aspects of FIG. 5 may assistant players (or viewers) in understanding which player is controlling which character.

Referring again to FIG. 1, in some cases, one or more users may leave a location and enter another location (e.g., while carrying a control device having a wireless configuration). For example, the first user 135 may leave the first location 150 and enter the second location 160 while carrying the first control device 132. The first user system 102 may be configured to movement of the first control device 132 from the first location 150 to the second location 160 (e.g., using location data reported by the first control device 132, such as global positioning system (GPS) data, or by detecting that a change in a signal-to-noise ratio (SNR) of wireless signals transmitted by the first control device 132 matches a signature SNR change associated with the movement).

In response to detecting movement of the first control device 132 from the first location 150 to the second location 160, the first user system 102 may be configured to send the first AV stream 106 to the second output device 158 (e.g., instead of to the first output device 152). In some implementations, the first user system 102 may continue sending the second AV stream 166 and the third AV stream 170 to the first output device 152 until detecting movement of the second control device 136 and the third control device 140, respectively, from the first location 150 to the second location 160.

In some implementations, certain data described with reference to FIG. 1 may be stored at a user-specific database 146 of the server 144, at a multi-user database 148 of the server 144, or both. For example, the first gameplay metric 121 may be stored at the user-specific database 146, which may include performance data associated with the first user 135. In another example, the one or more gameplay metrics 124 are stored at the multi-user database 148, which may store data associated with the video game application 116.

In some examples, one or both of the user-specific database 146 or the multi-user database 148 are accessible to one or more devices. For example, a peripheral device may perform lighting events or haptic feedback operations based on information of one or both of the user-specific database 146 or the multi-user database 148. Alternatively or in addition, a game developer may access one or both of the user-specific database 146 or the multi-user database 148 while adjusting a difficulty of a version of the video game application 116 or while designing a walk-through of the video game application 116. Other illustrative examples are described further below.

Figure 6:
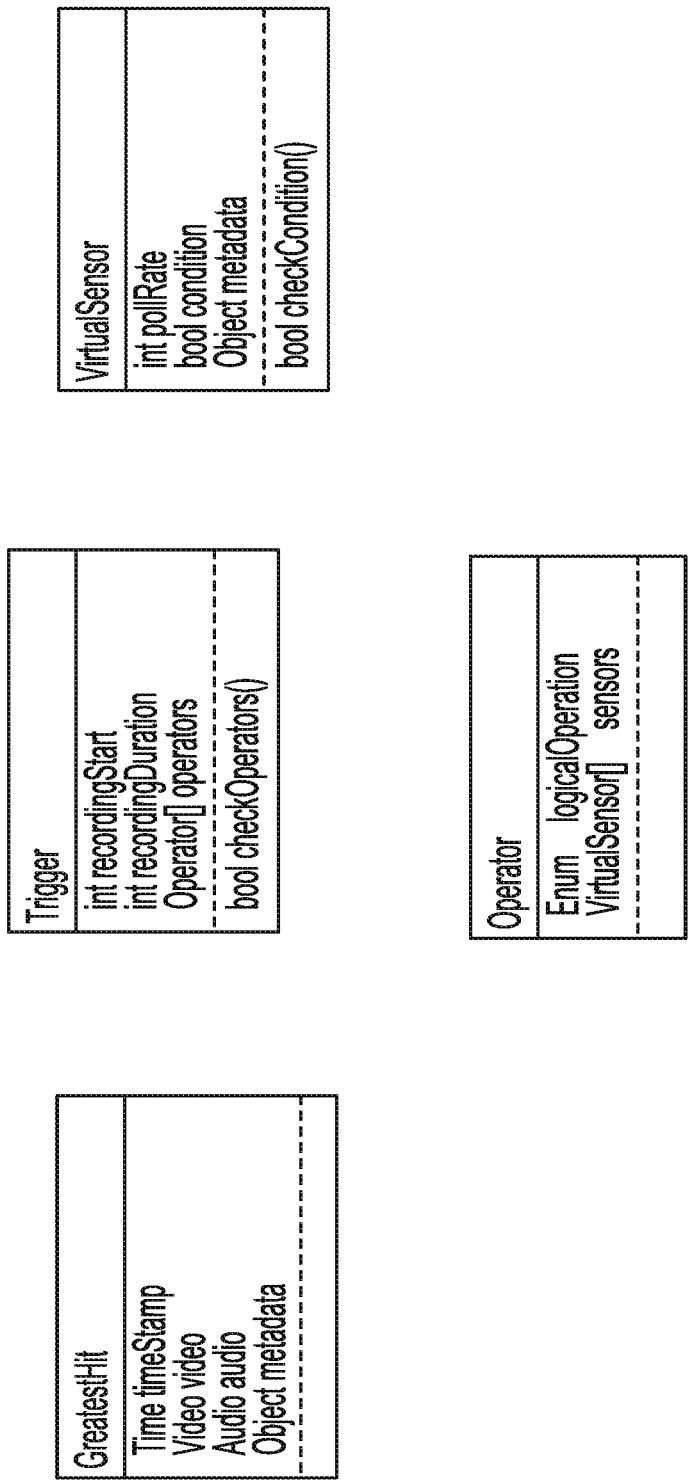
FIG. 6 illustrates examples of class diagrams in accordance with some aspects of the disclosure.

FIG. 6 is a diagram illustrating class diagrams in accordance with some aspects of the disclosure. In the example of FIG. 6, the clip 154 may correspond to a "greatest hit" detected during gameplay of the video game application 116. In FIG. 6, the greatest hit includes a time stamp, video data, audio data, and object metadata. The audio data and video data may be recorded during an event, and the time stamp may indicate a time of the recording. The metadata may indicate information associated with the recording, such as a number of actions per minute (APM), as an illustrative example.

One or more virtual sensors 120 may be associated with a condition. A virtual sensor may be inserted (e.g., by a game developer) into instructions of the video game application 116. During execution of the video game application 116 by the processor 104, the virtual sensor may cause the processor 104 to check whether the condition is satisfied, such as by monitoring a value of a register or a state machine to detect whether a boss character is present in the first AV stream 106. Metadata can be generated in response to detecting that the condition is satisfied. A trigger event of the one or more trigger events 126 may be associated with one or more operators. Each operator may be a grouping (e.g., permutation or subset) of the one or more virtual sensors 120. Event recording may be initiated in response to the trigger event at a certain time ("recordingStart") and for a certain duration ("recordingDuration"). A trigger event may be detected upon satisfaction of each condition specified by an operator corresponding to the trigger event.

Figure 7:
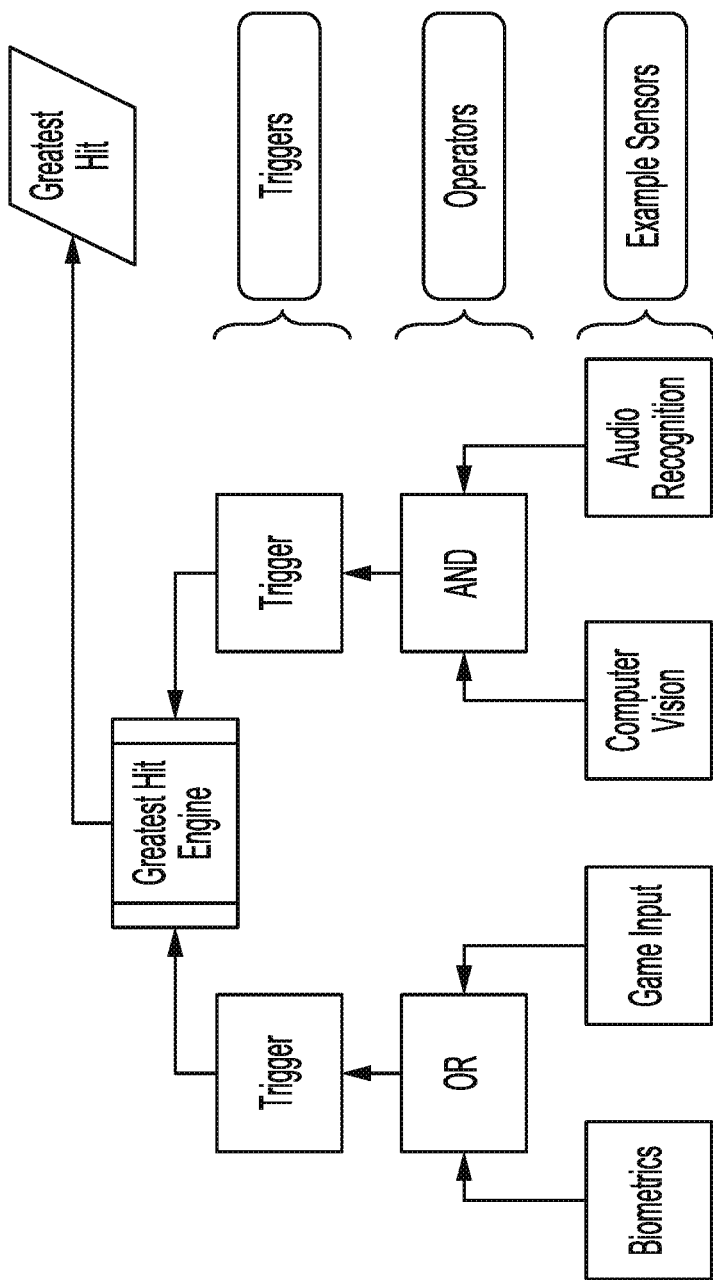
FIG. 7 illustrates an example of a method that may be performed by a device in accordance with some aspects of the disclosure.

FIG. 7 depicts an example of a method in accordance with certain aspects of the disclosure. In FIG. 7, a greatest hits engine is executable (e.g., by the processor 104) to generate a "greatest hit," which may correspond to the clip 154. An operator of FIG. 6 may be associated with a disjunctive grouping of one or more virtual sensors or a conjunctive grouping of one or more virtual sensors. For example, detection of a first trigger event may be conditioned on a certain biometric input or a certain game data input. As another example, detection of a second trigger event may be conditioned on a certain computer vision input and a certain audio recognition input. In some implementations, a greatest hit is captured in response to detection of any of multiple trigger events (e.g., upon detection of the first trigger event or the second trigger event) or in response to detection of multiple trigger events (e.g., upon detection of the first trigger event and the second trigger event).

Figure 8:
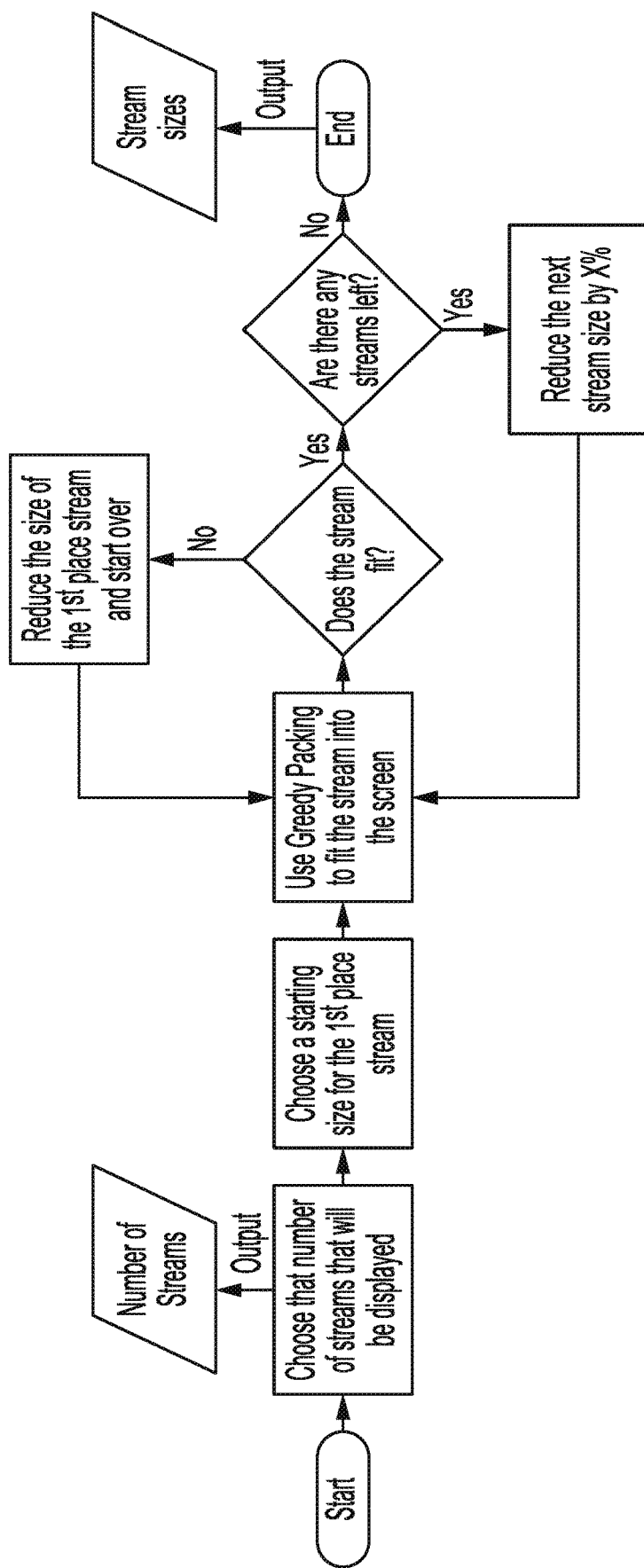
FIG. 8 illustrates another example of a method that may be performed by a device in accordance with some aspects of the disclosure.

FIG. 8 depicts another example of a method in accordance with certain aspects of the disclosure. The method of FIG. 8 uses a packing process to aggregate AV streams, such as to perform the dynamic screen aggregation operation of FIG. 2. The AV streams can be sized accordance to player performance, which may be indicated by the one or more gameplay metrics 124. A first-place AV stream may be associated with a largest size and may be placed first during the packing process. One or more additional streams may be reduced in size and combined with the first-place stream for concurrent display.

Figure 9:
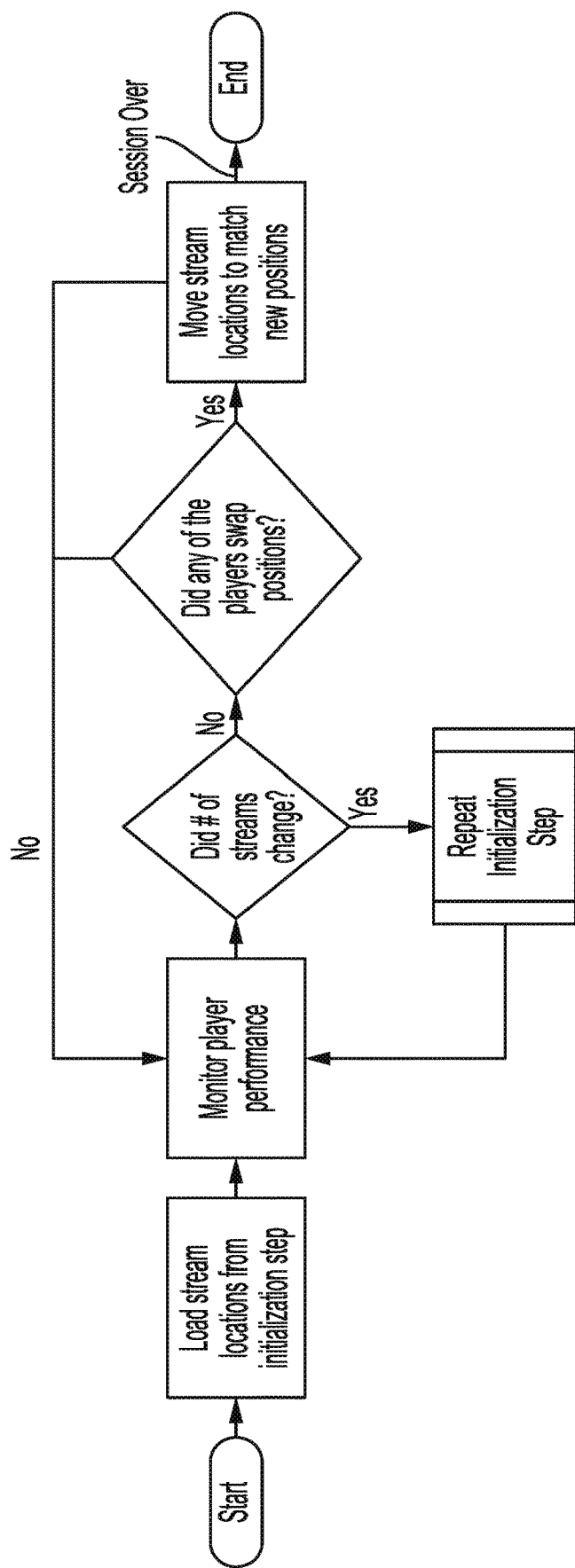
FIG. 9 illustrates another example of a method that may be performed by a device in accordance with some aspects of the disclosure.

FIG. 9 depicts another example of a method in accordance with certain aspects of the disclosure. The method of FIG. 9 illustrates operations that may be performed to dynamically adjust positions of AV streams. For example, positions of AV streams may be adjusted based on a change in player performance, based on a change in a number of the AV streams, or based on a change in player positions, as illustrative examples.

FIG. 10 depicts another example of a method in accordance with certain aspects of the disclosure. The method of FIG. 10 may be performed by a the first user system 102 or the server 144. The method includes receiving, by a device, a plurality of AV streams including a first AV stream and at least a second AV stream. The method also includes outputting the plurality of AV streams from the device to an output device for concurrent display using a first graphical arrangement of the plurality of AV streams. The first graphical arrangement depicts the first AV stream using a first size and further depicts the second AV stream using a second size. The method further includes adjusting, by the device, the concurrent display of the plurality of AV streams from the first graphical arrangement to a second graphical arrangement that depicts the first stream using an adjusted first size different than the first size, that depicts the second stream using an adjusted second size different than the second size, or a combination thereof. The adjusted first size is based, at least in part, on a gameplay metric associated with the first AV stream. The gameplay metrics may be based on a count of in-game events detected during gameplay by analyzing an audio-visual (AV) stream of the video game. The in-game events may be detected based on input/output (I/O) telemetry (e.g., rapid keystrokes), voice-based indicators (e.g., a comment made by a player of the video game), video-based indicators in the AV stream, audio-based indicators in the AV stream, biometric indicators associated with a player of the video game, other information, or a combination thereof. By analyzing an AV stream to detect in-game events, gameplay footage may be automatically identified and captured, reducing the need for users to capture and edit footage (e.g., using complicated video editing software).

Figure 11:
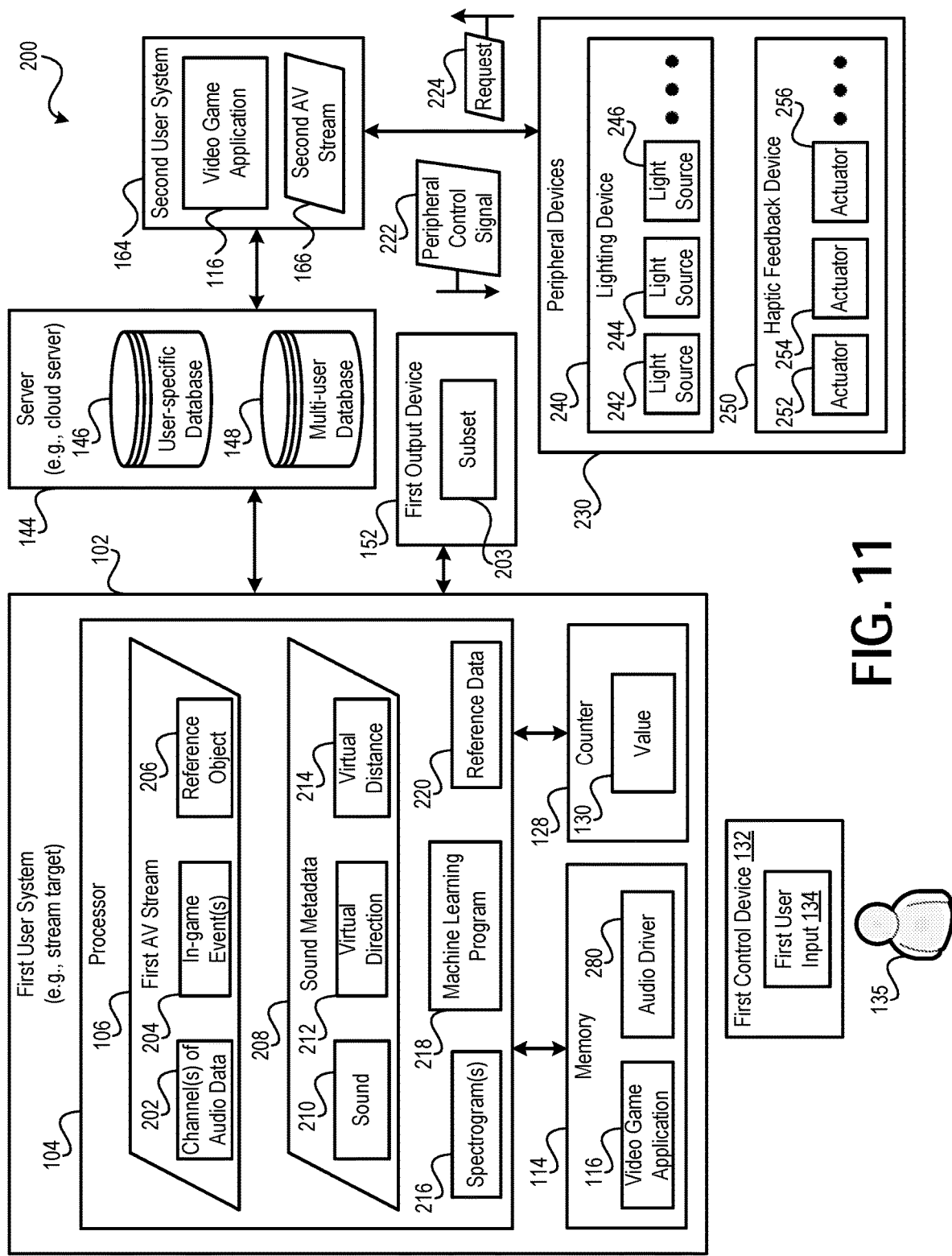
FIG. 11 illustrates another example of a system in accordance with some aspects of the disclosure.

Another illustrative example of a system 200 is depicted in FIG. 11. System 200 may include the first user system 102 and the second user system 164. The first user system 102 includes the processor 104 and the memory 114. The processor 104 is configured to retrieve the video game application 116 from the memory 114 and to execute the video game application 116 to generate an AV stream, such as the first AV stream 106. Depending on the implementation, the video game application 116 may correspond a single-user video game or a multi-user video game (e.g., as described with reference to certain aspects of FIG. 1). The system 200 further includes peripheral devices 230, which may be coupled to a user system, such as the second user system 164. The peripheral devices 230 may include a lighting device 240 including a plurality of light sources (e.g., light-emitting diodes (LEDs)), such as a light source 242, a light source 244, and a light source 246. The peripheral devices 230 may include a plurality of speakers (e.g., speakers arranged in a spatially localized configuration), and each light source of the lighting device 240 is disposed on a speaker enclosure of a respective speaker of the plurality of speakers. As an illustrative example, each light source of the lighting device 240 may correspond to a status light or power-on light of a speaker of the plurality of speakers. In one example, one or more of the light sources 242, 244, and 246 are included in the control devices 132, 136, and 140, and the light sources 242, 244, and 246 are configured to perform lighting operations described with reference to FIG. 5. In another example, the one or more of the light sources 242, 244, and 246 are included another device, such as in backlights of a keyboard. The peripheral devices 230 may include a haptic feedback device 250. The haptic feedback device 250 may include a plurality of actuators, such as an actuator 252, an actuator 254, and an actuator 256. In an illustrative example, the haptic feedback device 250 includes haptic chair. In another example, the haptic feedback device 250 is included within a game controller, such as the second control device 136.

During operation, the first AV stream 106 may be generated during execution of the video game application 116 by the processor 104. In the example of FIG. 11, the first AV stream 106 includes one or more channels of audio data 202. To illustrate, the one or more channels of audio data 202 may include a monaural signal. In another example, the one or more channels of audio data 202 include stereo signals. In another example, the one or more channels of audio data 202 include three or more channels of signals. Depending on the implementation, the one or more channels of audio data 202 may include one or more analog signals or one or more digital signals. The one or more channels of audio data 202 may include a title audio stream (e.g., a game audio stream generated by executing the video game application 116) or a system audio stream (e.g., a combination of the game audio stream and other audio, such as notification audio generated at the first user system 102 or control audio associated with user input to the first user system 102), as illustrative examples.

In some implementations, the processor 104 is configured to execute an audio driver 280. The audio driver 280 may be included in or specified by an operating system or a program of the first user system 102. The processor 104 may execute the audio driver 280 to enable the first user system 102 to interface with one or more audio devices, such as a receiver or one or more speakers included in the first output device 152.

In accordance with an aspect of the disclosure, a device of the system 200 may analyze the one or more channels of audio data 202 to detect one or more in-game events 204 of the video game application 116. In one example, the first user system 102 is configured to analyze the one or more channels of audio data 202 of the first AV stream 106 to detect the one or more in-game events 204. In another example, the server 144 may be configured to perform one or more operations described with reference to FIG. 11, such as analyzing the one or more channels of audio data 202 of the first AV stream 106 to detect the one or more in-game events 204.

In accordance with some aspects of the disclosure, one or more in-game events 204 may be detected without direct analysis of instructions of the video game application 116. For example, by detecting the one or more in-game events 204 by monitoring the first AV stream 106, use of software "hooks" to trigger certain operations (e.g., gameplay enhancement operations) may be avoided. In one example, the video game application 116 does not include software "hooks" that are executable to trigger gameplay enhancement operations.

In some examples, analyzing the one or more channels of audio data 202 includes generating one or more spectrograms 216 associated with the one or more channels of audio data 202. The one or more spectrograms may 216 may include a spectrogram for each channel of the one or more channels of audio data 202, a composite spectrogram for a composite (e.g., "mix-down") of the one or more channels of audio data 202, one or more other spectrograms, or a combination thereof.

The one or more spectrograms 216 may be compared to reference data 220 associated with a plurality of sounds. As an illustrative example, the reference data 220 may include, for each sound of the plurality of sounds, a sound signature indicating one or more characteristics (e.g., a frequency spectrum) of the sound (e.g., a vehicle sound or an explosion sound, as illustrative examples). The one or more channels of audio data 202 may be compared to the reference data 220 to determine whether sound indicated by the one or more channels of audio data 202 matches any of the plurality of sounds. In response to detecting that sound indicated by the one or more channels of audio data 202 matches one or more sounds indicated by the reference data 220, one or more in-game events 204 may be detected. As an illustrative example, in response to detecting that a sound indicated by the one or more channels of audio data 202 matches an explosion sound indicated by the reference data 220, an explosion event of the one or more in-game events 204 may be detected.

Alternatively or in addition, analyzing the one or more channels of audio data 202 may include inputting the one or more channels of audio data 202 to a machine learning program 218. The machine learning program 218 may be executable by the processor 104 to identify the one or more in-game events 204 based on the one or more channels of audio data 202. In some examples, the machine learning program 218 is trained using training data, which may include the reference data 220, as an illustrative example. To further illustrate, the machine learning program 218 may include a plurality of weights including first weights associated with a first sound (e.g., an explosion sound) and second weights associated with a second sound (e.g., a vehicle sound). The first plurality of weights and the second plurality of weights may be determined (e.g., "learned") by the machine learning program 218 during a training process that uses the training data. An output of the machine learning program 218 may be generated by applying the plurality of weights to the one or more channels of audio data 202. The output may be compared to a plurality of reference outputs to detect the one or more in-game events 204. For example, if the one or more channels of audio data 202 indicate an explosion sound, then applying the first weights to the one or more channels of audio data 202 may cause the output to have a signature indicating the explosion sound. As another example, if the one or more channels of audio data 202 indicate a vehicle sound, then applying the second weights to the one or more channels of audio data 202 may cause the output to have a signature indicating the vehicle sound.

In accordance with an aspect of the disclosure, a device of the system 100 is configured to generate sound metadata 208 (e.g., gameplay telemetry data) based on the one or more in-game events 204. In one example, the first user system 102 is configured to generate the sound metadata 208. In another example, the server 144 is configured to generate the sound metadata 208.

In some implementations, the sound metadata 208 includes, for an in-game event of the one or more in-game events 204, an indication of a sound 210 associated with the in-game event. For example, if the sound 210 corresponds to a vehicle sound, then the indication of the sound 210 may include a first sequence of bits indicating a vehicle sound. As another example, if the sound 210 corresponds to an explosion sound, then the indication of the sound 210 may include a second sequence of bits indicating an explosion sound.

In some examples, the sound metadata 208 further includes an indication of a virtual direction 212 associated with the sound 210. To illustrate, if an amplitude of the sound 210 decreases as a function of time, then the indication of the virtual direction 212 may specify that the sound 210 appears to attenuate relative to a reference object 206 (e.g., a character) in the video game application 116. As another example, if the sound 210 appears to move across channels in a sequence (e.g., left to right), then the indication of the virtual direction 212 may specify that a source of the sound 210 appears to move to the right relative to the reference object 206.

Alternatively or in addition, the sound metadata 208 may include an indication of a virtual distance 214 from a source of the sound 210 to the reference object 206. To illustrate, if an amplitude of the sound 210 is relatively small, then the indication of the virtual distance 214 may be greater.

In some examples, the sound metadata 208 includes an indication of a point of gameplay associated with the sound 210 (e.g., a time or place of the gameplay at which time the one or more in-game events 204 occur). In some implementations, upon detecting an event of the one or more in-game events 204, a value of a program counter associated with the video game application 116 is identified and included in the sound metadata 208. Alternatively or in addition, the sound metadata 208 may indicate a timestamp or a frame number associated with the event.

In some examples, a device of the system 200 (e.g., the first user system 102 or the server 144) is configured to initiate storage of the sound metadata 208 to a database. In some examples, the sound metadata 208 is stored to the user-specific database 146, the multi-user database 148, or both. Alternatively or in addition, the first user system 102 may include a database, and the sound metadata 208 may be stored to the database of the first user system 102.

In accordance with an aspect of the disclosure, storing the sound metadata 208 to a database enables one or more gameplay enhancement operations at one or more peripheral devices during the execution of the video game application 116. As an illustrative example, a user system (e.g., the first user system 102, the second user system 164, or the third user system 168) may access the database (e.g., upon loading of the video game application) to identify one or more gameplay enhancement operations to be initiated during gameplay.

To further illustrate, in one example, the second user system 164 is configured to request the sound metadata 208 from the server 144 in response to executing the video game application 116. For example, the second user system 164 may send a message to the server 144 identifying the video game application 116 and requesting sound metadata associated with the video game application 116. The second user system 164 may receive, from the server 144, a reply including the sound metadata 208 in response to the message.

During gameplay, the second user system 164 may trigger one or more gameplay enhancement operations at the one or more of the peripheral devices 230. In one example, the second user system 164 is configured to send a peripheral control signal 222 to one or more of the peripheral devices 230 to initiate a gameplay enhancement operation.

Alternatively or in addition, one or more of the peripheral devices 230 may be configured to send a request 224 (e.g., a polling message) to obtain one or more parameters of the sound metadata 208. To illustrate, in some examples, the peripheral devices 230 may include a smart device (e.g., a robot, a smart appliance, or a smart home automation device) that is configured to detect gameplay of the video game application 116 (e.g., using a computer vision technique, an audio recognition technique, or a combination thereof) and to send the request 224 in response to detecting gameplay of the video game application 116. In some examples the request 224 is sent to the server 144 or to the second user system 164.

In one example, the sound metadata 208 enables the lighting device 240 to perform a directional lighting feedback event during an in-game event of the plurality of the in-game events 204. The directional lighting event may include selectively activating one or more of the light sources 242, 244, and 246 based on an identification of the one or more in-game events 204 indicated by the sound metadata 208. In one example, the directional lighting event is based on the virtual direction 212 indicated by the sound metadata 208. For example, if the in-game event includes movement of a vehicle, the light sources 242, 244, and 246 may be selectively activated based on the virtual direction 212 of the movement of the vehicle, such as by selectively activating the light source 242 before the light source 244 and by selectively activating the light source 244 before the light source 246 (e.g., to simulate movement of the vehicle from left to right). As another example, if the in-game event includes an explosion, the light sources 242, 244, and 246 may be activated and then throttled off to simulate attenuation of noise of the explosion.

Alternatively or in addition, the directional lighting feedback event may be based on the virtual distance 214. For example, an intensity of light generated by the light sources 242, 244, and 246 may be increased for a smaller virtual distance 214 (e.g., to indicate that the sound 210 appears to be close to the reference object 206) or decreased for a greater virtual distance 214 (e.g., to indicate that the sound 210 is appears to be far from the reference object 206).

Alternatively or in addition, the directional lighting feedback event may include modifying a color of light generated by one or more of a plurality of light sources of the lighting device. For example, an LED color may be selected based on a type of the event, such as by selecting a red or orange color for an explosion event.

Alternatively or in addition, the sound metadata 208 may enable the haptic feedback device 250 to perform a directional haptic feedback event during an in-game event of one or more in-game events 204. In some examples, the haptic feedback device 250 may be configured to selectively activate one or more of the actuators 252, 254, and 256 based on an identification of the one or more in-game events 204 indicated by the sound metadata 208. In one example, the directional haptic feedback event is performed based on the virtual direction 212, such as by selectively activating the actuator 252 before the actuator 254 and by selectively activating the actuator 254 before the actuator 256 (e.g., to simulate movement of a vehicle from left to right). Alternatively or in addition, the haptic feedback device 250 may be configured to modify an intensity and/or pattern of haptic feedback generated by the actuators 252, 254, and 256 based on the virtual distance 214 (e.g., by reducing the intensity of the haptic feedback if the virtual distance 214 indicates the sound 210 is far away from the reference object 206). Alternatively or in addition, the haptic feedback device 250 may be configured to modify the pattern of haptic feedback generated by the actuators 252, 254, and 256 based on a type of event, such as by selecting a long vibration for an explosion event.

In some implementations, the audio driver 280 is executable by the processor 104 to generate an indication of a first number of audio channels. The audio driver 280 may provide the indication of the first number to the video game application 116, and the processor 104 may be configured to execute the video game application 116 to generate a plurality of channels of audio data 202 based on the indication of the first number. As a non-limiting example, the audio driver 280 may specify an eight-channel audio format to the processor 104 to indicate that eight channels of audio should be included in the first AV stream 106. In this example, the processor 104 may generate, based on the indication, eight channels of audio data 202.

In one example, the processor 104 is configured to provide a subset 203 of the plurality of channels of audio data 202 to the first output device 152, and a second number of audio channels associated with the subset 203 is less than the first number. As an example, the first number may correspond to an eight-channel format, and the second number may correspond to a two-channel stereo format. One or more operations described with reference to FIG. 11 may be performed based on the plurality of channels of audio data 202 instead of the subset 203. For example, the sound metadata 208 may be determined based on the plurality of channels of audio data 202 instead of the subset 203. In some examples, after determining the sound metadata 208 based on the plurality of channels of audio data 202, at least one channel of the plurality of channels of audio data 202 may be discarded (e.g., by erasing, invalidating, or overwriting the at least one channel from a buffer) to generate the subset 203, or the plurality of channels of audio data 202 may be "down-converted" (e.g., from eight channels to two channels) to generate the subset 203.

Use of the audio driver 280 may "trick" the video game application 116 into generating more channels of audio data 202 than are compatible with the first output device 152. Because the first number of channels of audio data 202 may include more information than the second number of channels of audio data 202, "tricking" the video game application 116 into generating a greater number of channels of audio data 202 may increase an amount of audio that is available for generating the sound metadata 208, improving accuracy or an amount of detail associated with the sound metadata 208 (e.g., so that locations or directions associated with sounds are estimated more accurately).

In some examples, one or more aspects described with reference to FIG. 11 are used in connection with one or more other aspects described herein. As an example, the one or more in-game events 204 may be included in or may correspond to the one or more trigger events 126 of FIG. 1. In this example, one or more operations described with reference to FIG. 1 can be performed in response to detection of the one or more in-game events 204, such as by incrementing the value 130 of the counter 128 in response to detection of the one or more in-game events 204 or by determining the first gameplay metric 121 in response to detection of the one or more in-game events 204. Alternatively or in addition, one or more operations described with reference to FIGS. 2, 3, 4, and 5 may be performed in response to detection of the one or more in-game events 204 (e.g., by performing a dynamic screen aggregation operation to increase the first size 176 of the first AV stream 106 in response to detecting the one or more in-game events 204 in the first AV stream 106, as an illustrative example).

Figure 12:
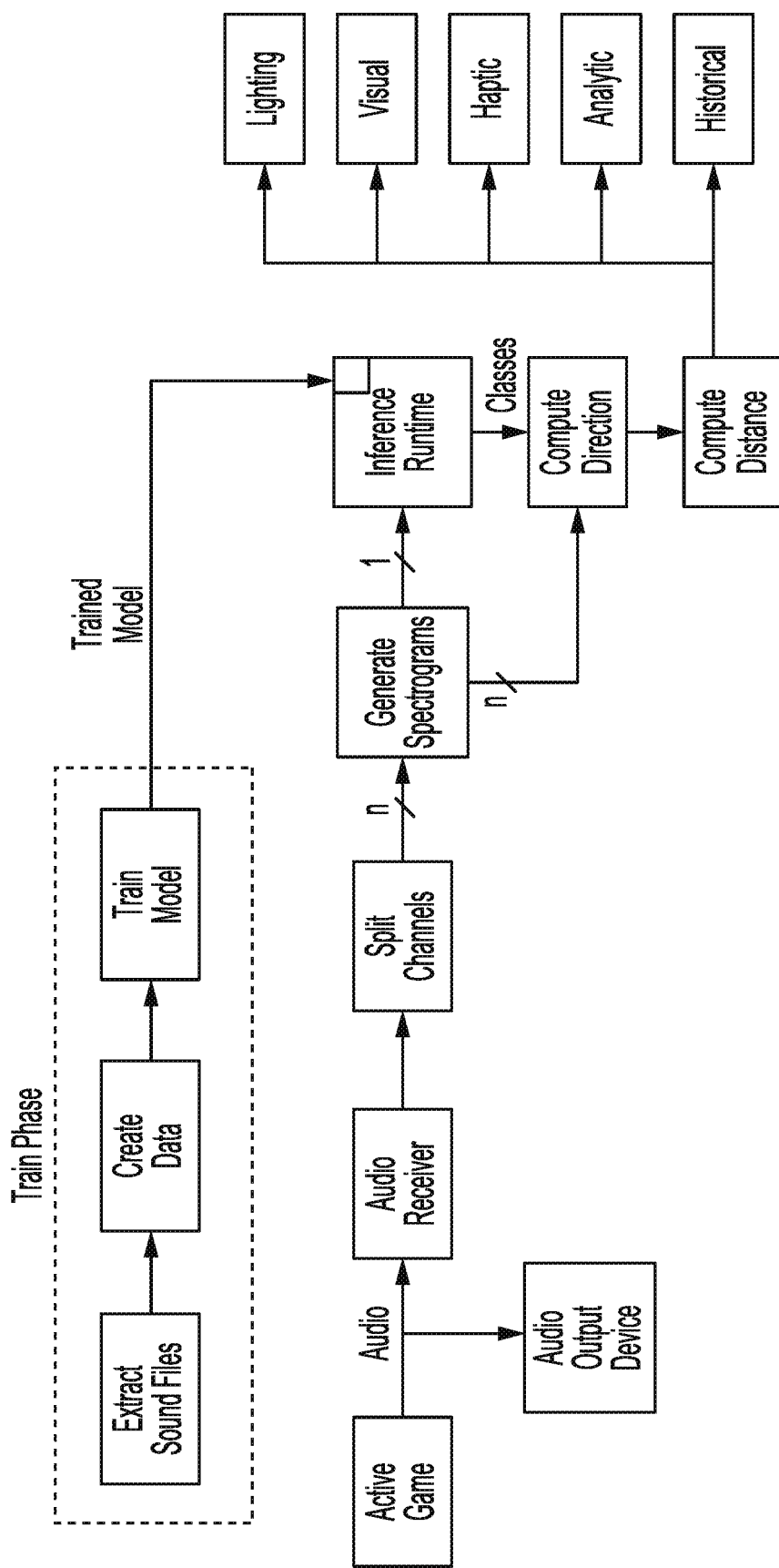
FIG. 12 illustrates an example of a method that may be performed by a device in accordance with some aspects of the disclosure.

FIG. 12 illustrates an example of a method that may be performed in accordance with certain aspects of the disclosure. In some examples, operations of the method of FIG. 12 are performed to generate a plurality of gameplay enhancement operations, such as a lighting gameplay enhancement operation, a visual gameplay enhancement operation, a haptic gameplay enhancement operation, an analytic gameplay enhancement operation, and a historical gameplay enhancement operation.

Figure 13:
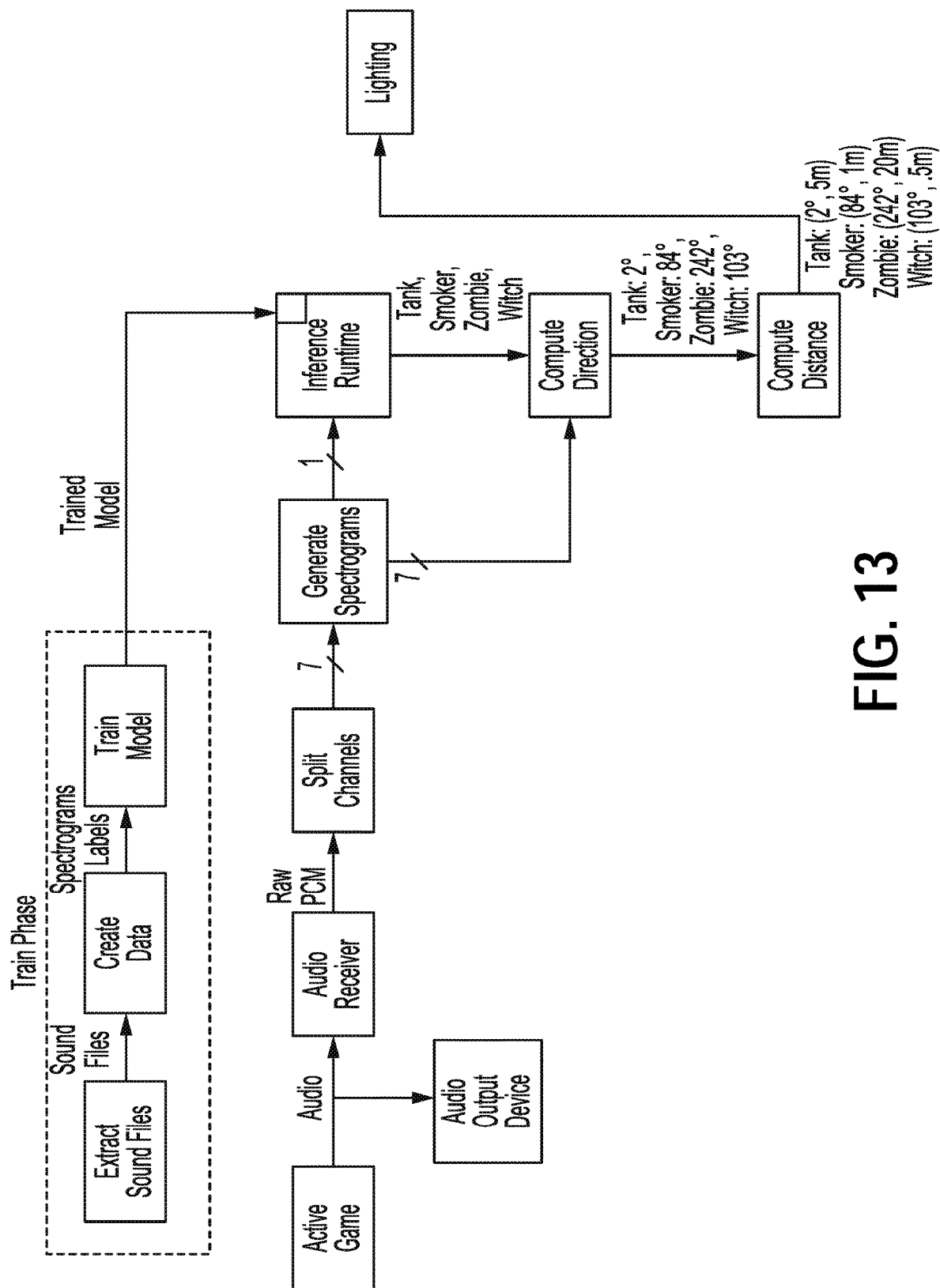
FIG. 13 illustrates another example of a method that may be performed by a device in accordance with some aspects of the disclosure.

FIG. 13 illustrates another example of a method that may be performed in accordance with certain aspects of the disclosure. In FIG. 13, sounds of a plurality of objects (e.g., a tank, a smoker, a zombie, and a witch) are detected in the first AV stream 106. As illustrated in FIG. 13, a virtual distance (e.g., the virtual distance 214) and a virtual direction (e.g., the virtual direction 212) can be determined for each of the plurality of objects. In the non-limiting example of FIG. 13, the virtual distances correspond to 2 degrees, 84 degrees, 242 degrees, and 103 degrees. The non-limiting example of FIG. 13 also shows that the virtual distances correspond to 5 meters (m), 1 m, 20 m, and 0.5 m.

Figure 14:
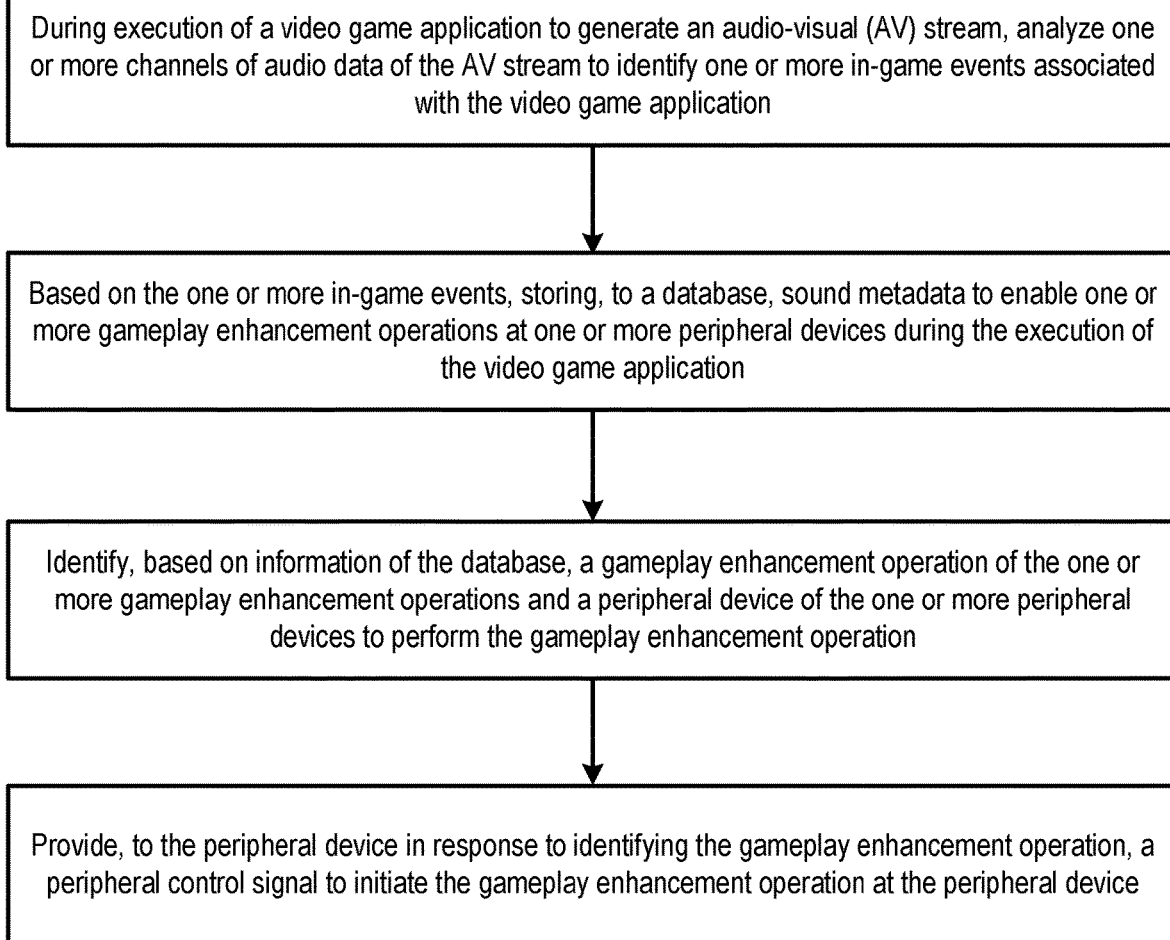
FIG. 14 illustrates an additional example of a method that may be performed by a device in accordance with some aspects of the disclosure.

FIG. 14 illustrates another example of a method that may be performed in accordance with certain aspects of the disclosure. In one example, operations of the method of FIG. 14 are performed by the first user system 102, the second user system 164, or the third user system 168. Alternatively or in addition, one or more operations of the method of FIG. 14 can be performed by one or more other devices, such as by the server 144.

The method of FIG. 14 includes, during execution of a video game application to generate an AV stream, analyzing one or more channels of audio data of the AV stream to identify one or more in-game events associated with the video game application. The method further includes storing, based on the one or more in-game events, sound metadata to a database to enable one or more gameplay enhancement operations at one or more peripheral devices during the execution of the video game application. The method further includes identifying, based on information of the database, a gameplay enhancement operation of the one or more gameplay enhancement operations and a peripheral device of the one or more peripheral devices to perform the gameplay enhancement operation. The method also includes providing, to the peripheral device in response to identifying the gameplay enhancement operation, a peripheral control signal to initiate the gameplay enhancement operation at the peripheral device.

Figure 15:
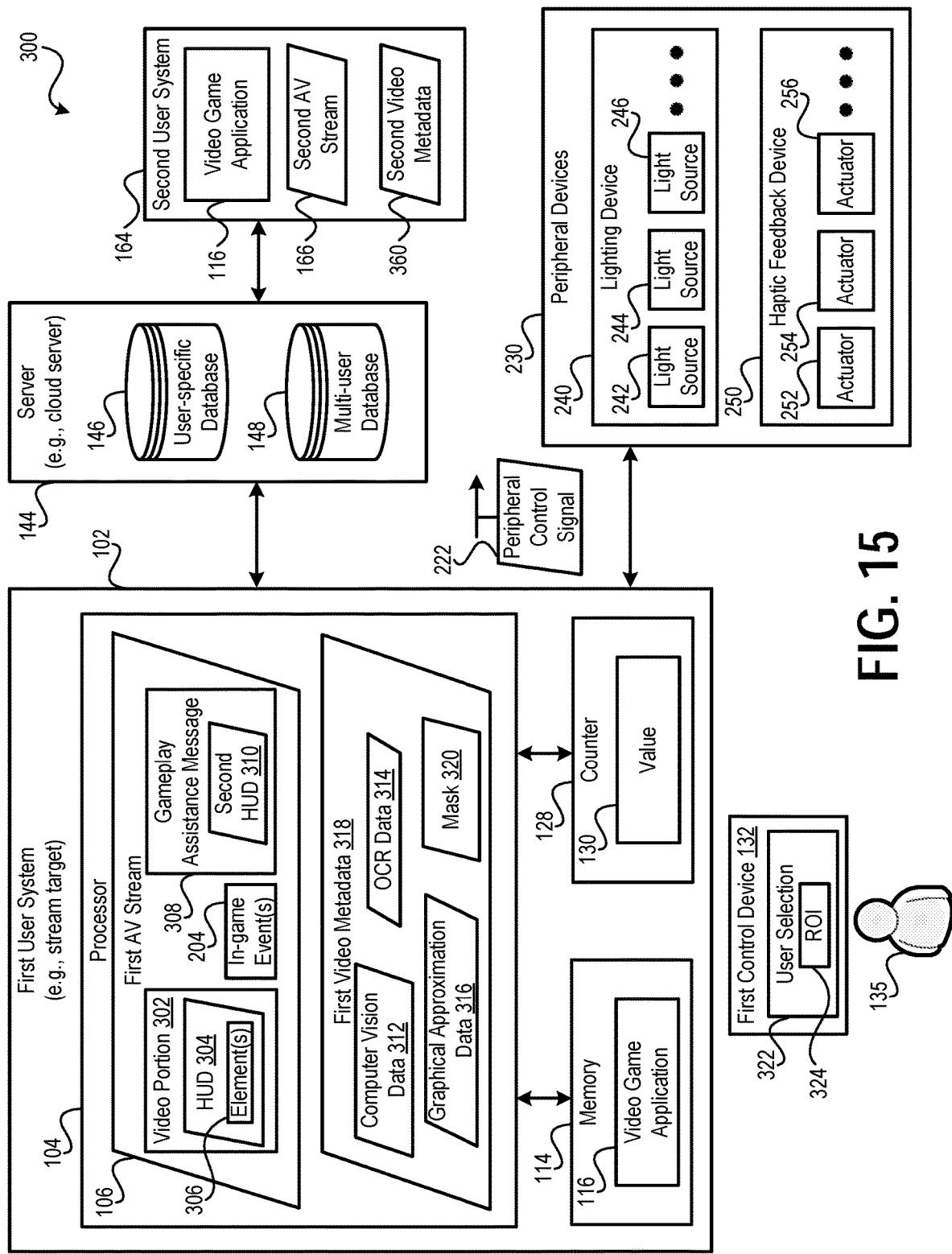
FIG. 15 illustrates another example of a system in accordance with some aspects of the disclosure.
Figure 16:
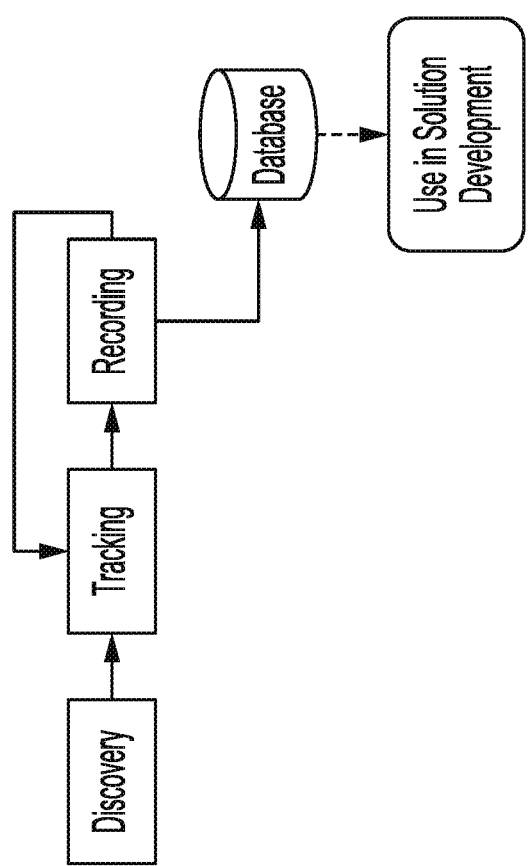
FIG. 16 illustrates examples of operations that may be performed by a device in accordance with some aspects of the disclosure.
Figure 17:
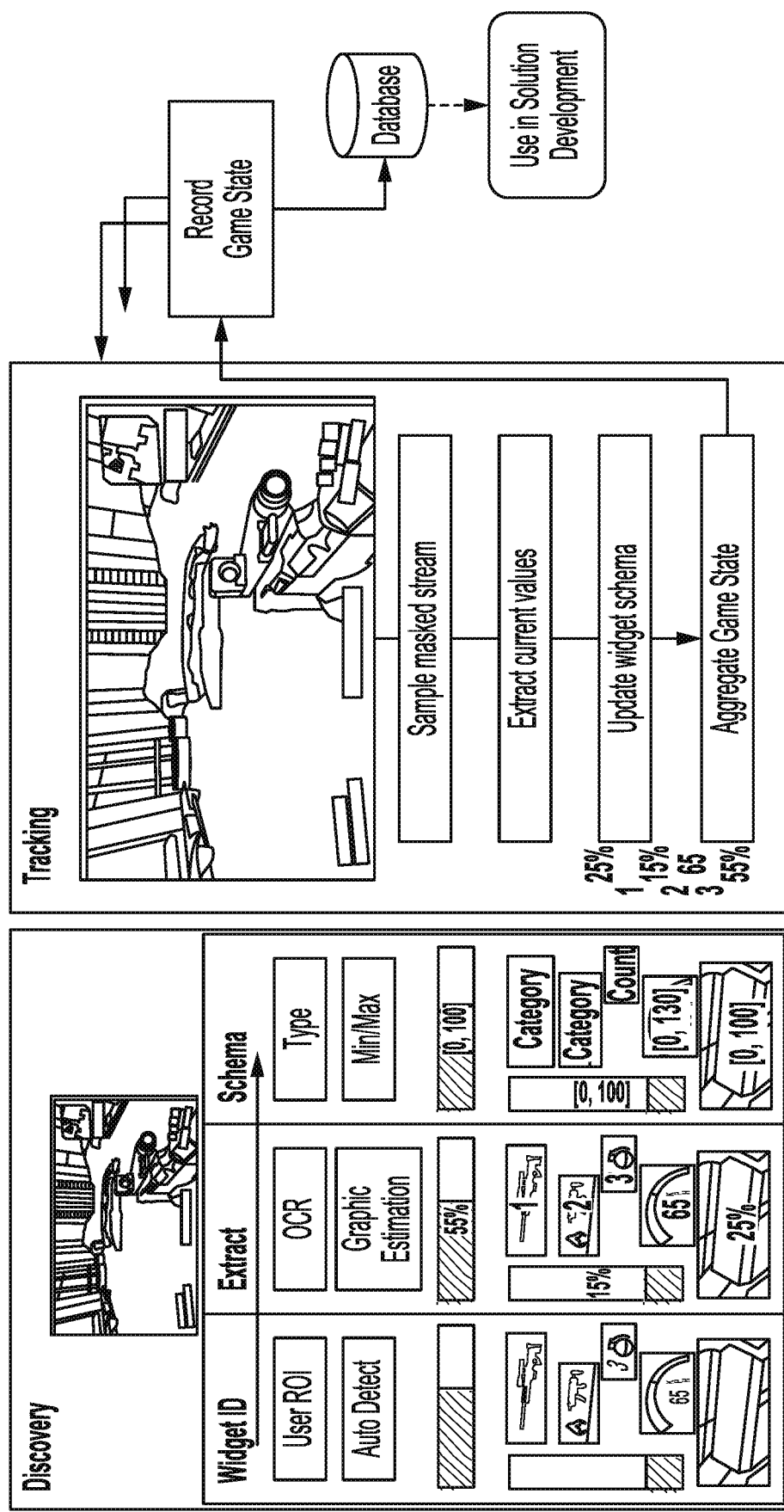
FIG. 17 illustrates additional examples of operations that may be performed by a device in accordance with some aspects of the disclosure.
Figure 18:
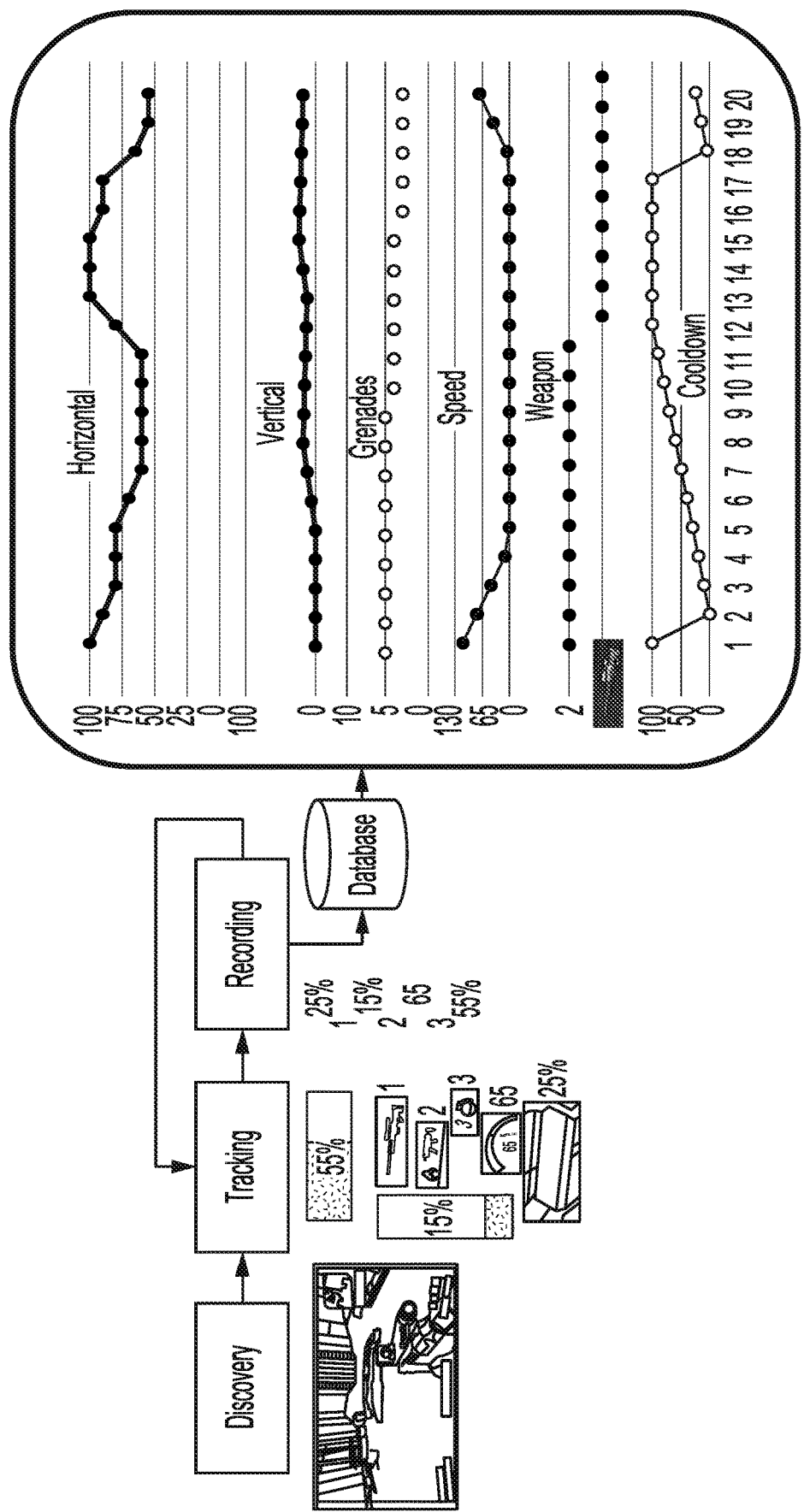
FIG. 18 illustrates further examples of operations that may be performed by a device in accordance with some aspects of the disclosure.

Referring to FIG. 15, another illustrative example of a system is depicted and generally designated 300. In the example of FIG. 15, the system 300 includes one or more user systems, such as the first user system 102 and the second user system 164. The first user system 102 includes the processor 104 and the memory 114. The processor 104 is configured to retrieve the video game application 116 from the memory 114 and to execute the video game application 116 to generate an AV stream, such as the first AV stream 106. Depending on the implementation, the video game application 116 may correspond a single-user video game or a multi-user video game (e.g., as described with reference to certain aspects of FIG. 1). In the example of FIG. 15, the first user system 102 is coupled to one or more peripheral devices, such as the peripheral devices 230.

In the example of FIG. 15, the first AV stream 106 includes a video portion 302. The video portion 302 includes a heads-up display (HUD) 304. The first AV stream 106 may further include an audio portion, such as the one or channels of audio data 202 of FIG. 11. In one example, the HUD 304 presents game information during gameplay of the video game application 116, such as character health, game status information, weapon information, or other information.

During operation, the first user system 102 is configured to analyze the first AV stream 106 to detect one or more elements 306 (also referred to herein as widgets) of the HUD 304 and to identify one or more in-game events associated with the video game application 116, such as the one or more in-game events 204. In one example, the one or more elements 306 of the HUD 304 indicate character health, game status information, weapon information, or other information.

In one example, the first user system 102 is configured to receive user selection 322 of an element of the one or more elements 306. For example, the user selection 322 may identify a region of interest (ROI) 324 of the HUD 304 including the element. In some examples, the first user 135 may click, mouse over, or perform another operation indicating the ROI 324 via the user selection 322 (e.g., to enlarge or inspect the element). The processor 104 may be configured to identify the one or more elements 306 of the HUD 304 based on the user selection 322.

In another example, an element of the one or more elements 306 is identified by detecting that the element maintains a common position in at least a threshold number of frames of the video portion. For example, the processor 104 may be configured to monitor frames of the video portion 302 and to determine which regions of the video portion 302 remain fixed during gameplay. The processor 104 may be configured to detect that regions of the video portion 302 that change during gameplay correspond to gameplay elements and that regions of the video portion 302 that remain fixed (or substantially fixed) correspond to the one or more elements 306 of the HUD 304.

The processor 104 may be configured to generate first video metadata 318 (e.g., gameplay telemetry data) based on the one or more elements 306 of the HUD 304. The first video metadata 318 may correspond to a game state of the video game application 116 and may be associated with the first user 135. The processor 104 may be configured to generate the first video metadata 318 using a computer vision technique (e.g., by generating computer vision data 312), an optical character recognition (OCR) technique (e.g., by generating OCR data 314), using a graphical approximation technique (e.g., by generating graphical approximation data 316), using one or more other techniques, or a combination thereof.

In some examples, the first video metadata 318 indicates one or more regions of the HUD 304 including the one or more elements 306. For example, the first video metadata 318 may indicate pixel coordinates of an element of the one or more elements 306 or an object identifier specifying an element of the one or more elements 306. The first video metadata 318 may further indicate a game state of the video game application at the time of detection of the one or more elements 306. The game state may include a program counter value associated with execution of the video game application 116 or a level or stage of the video game application 116, as illustrative examples.

In one implementation, the first video metadata 318 indicates, for an element of the one or more elements 306, a count of the element. For example, the element may correspond to a health bar region of the HUD 304, and the count may be the number of health bars displayed in the health bar region.

In one example, the first video metadata 318 indicates a category of each of the one or more elements 306. In some implementations, a category is assigned to an element that is associated with a count in the HUD 304. For example, an element may correspond to a status or other indication (e.g., "high scorer") that is not associated with a count.

In some implementations, the first video metadata 318 indicates a range of values for an element of the one or more elements 306. The range of values may indicate a minimum possible value of the element and a maximum possible value of the element. As an example, if the element indicates a score of zero out of five stars, then the range of values for the element may be zero to five stars.

The processor 104 may be configured to track the one or more elements 306 during gameplay of the video game application 116. For example, the processor 104 may be configured to detect changes in the one or more elements 306, such as a change in an amount of health of a character, a change in status, or a change in score. The processor 104 may be configured to update the first video metadata 318 to indicate the changes to the one or more elements 306 (e.g., where the first video metadata 318 indicates a history of each element of the one or more elements 306).

In some examples, tracking the one or more elements 306 includes generating a mask 320 based on locations of the one or more elements 306 within the HUD 304. The processor 104 may be configured to apply the mask 320 to the video portion 302 to generate a masked version of the video portion 302. For example, the processor 104 may be configured to apply the mask 320 to the video portion 302 (e.g., by overlaying the mask 320 over the video portion 302) so that regions of the video portion 302 other than the one or more elements 306 are covered, obscured, or "blacked out." The processor 104 may be configured to sample the one or more elements 306 from the masked version (e.g., by performing a computer vision operation, an OCR operation, or a graphical approximation operation based on the masked version). Use of the mask 320 to generate a masked version of the video portion 302 may reduce an amount of video processing performed by the processor 104 (e.g., by obscuring one or more regions of the video portion 302 so the one or more regions are excluded from a computer vision operation, an OCR operation, a graphical approximation operation, or another operation).

The processor 104 may be configured to store the first video metadata 318 to a database, such as the user-specific database 146, the multi-user database 148, or both. In another example, the first user system 102 includes a database, and the processor 104 may be configured to store the first video metadata 318 to the database of the first user system 102.

The processor 104 may be configured to retrieve, from a database, second video metadata 360 corresponding to the game state of the video game application 116 and associated with the second user 139. For example, the multi-user database 148 may receive and store the second video metadata 360 (e.g., prior to generation of the first video metadata 318). The second user system 164 may generate the second video metadata 360 using any technique described herein, such as one or more techniques described with reference to the first video metadata 318.

The processor 104 may be configured to perform a comparison of the first video metadata 318 and the second video metadata 360 to determine one or more gameplay enhancement operations, such as a gameplay assistance message 308. The gameplay assistance message 308 may offer one or more tips based on video metadata collected from gameplay of better-performing players. In one example, the gameplay assistance message 308 indicates one or more tips, based on gameplay of the second user 139 indicated by the second video metadata 360, to improve gameplay performance of the first user 135 relative to the second user 139 (e.g., "use more grenades"). The gameplay assistance message 308 may offer "coaching" to a user (e.g., for a particularly challenging portion of the video game application 116).

In some examples, the gameplay assistance message 308 includes or is presented via a second HUD 310 of the first AV stream 106. The second HUD 310 may augment the video portion 302 and offer tips or feedback to a user (e.g., in real time or near-real time during gameplay or in aggregations after gameplay). In some examples, the gameplay assistance message 308 includes haptic feedback (e.g., via the haptic feedback device 250), visual feedback (e.g., via the lighting device 240), audio feedback, other feedback, or a combination thereof. It is noted that the gameplay assistance message 308 can be provided based on the sound metadata 208 of FIG. 11 (alternatively or in addition to the first video metadata 318 of FIG. 15).

In some examples, video metadata for multiple users is collected and compared to enable game state tracking or visualization within a gaming session of multiple users. The video metadata for the multiple users may be synchronized (e.g., by grouping metadata associated with a common game state). In some implementations, a collection device (or "agent") is configured to perform multi-source event detection and capture of game state and user response. The user response may be captured in game (e.g., by detecting the in-game events 204), based on external communications (e.g., text messages, emails, or social media messages), or a combination thereof. The collection device may be configured to capture and synthesize differential activity and to characterize the intensity and priority of the response as a complete sample (e.g., using a full enumeration of event sources, game state, and user response). The samples may be captured, recorded locally, and used to enable a variety of other solutions, such as coaching of gamers based on comparative sample response analysis, tagging in-game highlights (e.g., as described with reference to the clip 154 in FIG. 1), tracking user performance across titles using stimulus/response scoring, or providing a multi-user tactics and prioritization engine. Thus, in some aspects, a buffered stream is analyzed to capture and record events for later analysis from a main continuous capture stream. In some aspects, a system is configured to detect and classify in-game event stimuli and to capture subsequent user response and sentiment across game and communications platforms.

In some examples, one or more aspects described with reference to FIG. 15 are used in connection with one or more other aspects described herein. For example, the one or more in-game events 204 may be included in or may correspond to the one or more trigger events 126 of FIG. 1. In this example, one or more operations described with reference to FIG. 1 can be performed in response to detection of the one or more in-game events 204, such as by incrementing the value 130 of the counter 128 in response to detection of the one or more in-game events 204 or by determining the first gameplay metric 121 in response to detection of the one or more in-game events 204. Alternatively or in addition, one or more operations described with reference to FIGS. 2, 3, 4, and 5 may be performed in response to detection of the one or more in-game events 204 (e.g., by performing a dynamic screen aggregation operation to increase the first size 176 of the first AV stream 106 in response to detecting the one or more in-game events 204 in the first AV stream 106, as an illustrative example).

FIGS. 16, 17, 18, and 19 illustrate examples of operations that may be performed by the first user system 102. In FIGS. 16, 17, 18, and 19, the operations include discovery of the one or more elements 306 (e.g., widgets) of the HUD 304, tracking of the one or more elements 306 of the HUD 304, and recording, to a database, of the one or more elements 306 of the HUD 304. The one or more elements 306 of the HUD 304 may be used in solution development, such as to generate the gameplay assistance message 308, as an illustrative example. The one or more elements 306 of the HUD 304 may be used in solution development, such as to generate the gameplay assistance message 308 according to an in-game event 204 captured from the first video metadata 318. The in-game event 204 may be captured in response to detecting that the in-game event 204 corresponds to an "outlier" that differs from gameplay observed from other player performances (e.g., in response to detecting approach of an extremum according to an observed schema from the user-specific database 146, as an illustrative example).

Figure 20:
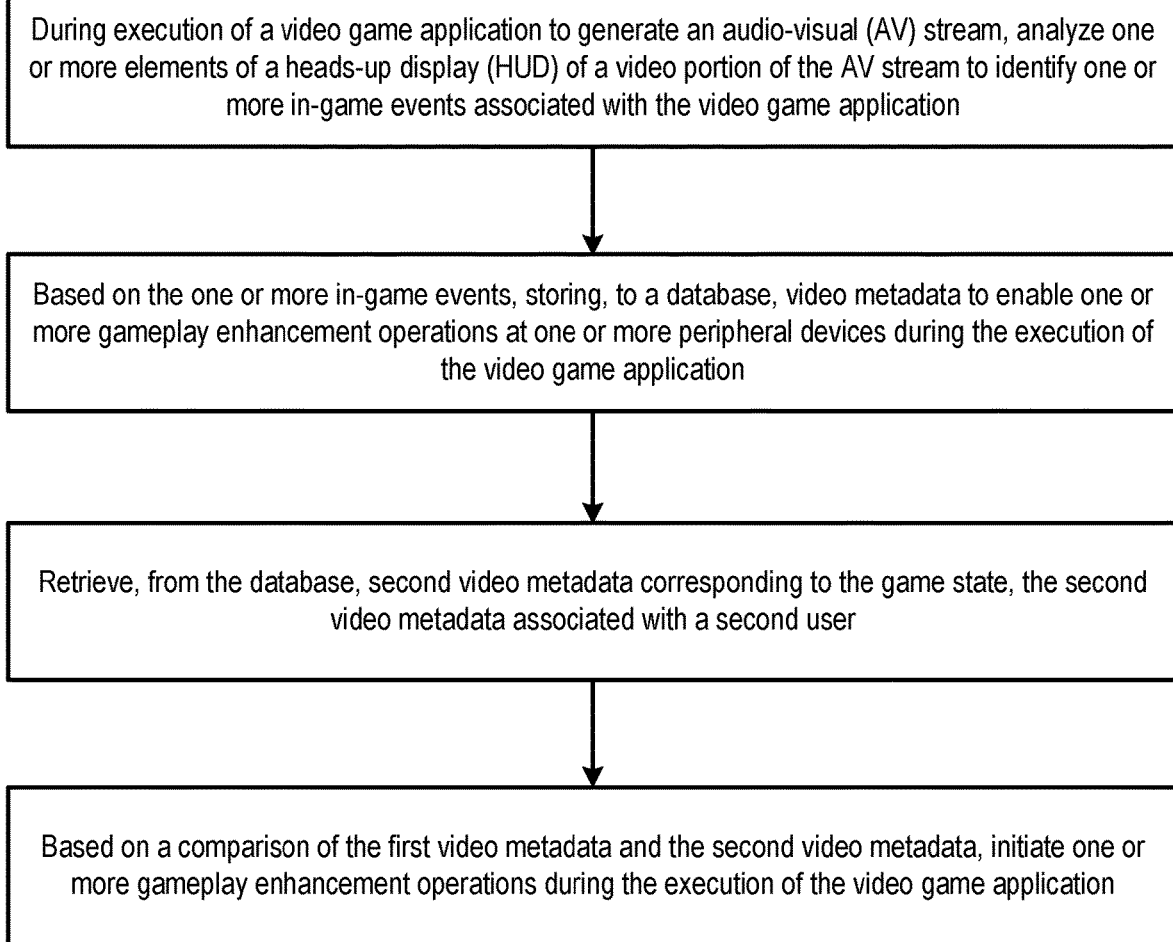
FIG. 20 illustrates an example of a method that may be performed by a device in accordance with some aspects of the disclosure.

FIG. 20 illustrates an example of a method in accordance with an aspect of the disclosure. Operations of the method of FIG. 20 may be performed by a device, such as by the first user system 102. In other examples, operations of the method of FIG. 20 may be performed by another device, such as the server 144. The method of FIG. 20 includes, during execution of a video game application to generate an AV stream, analyzing one or more elements of a heads-up display (HUD) of a video portion of the AV stream to identify one or more in-game events associated with the video game application. The method of FIG. 20 further includes, based on the one or more in-game events, storing, to a database, first video metadata corresponding to a game state of the video game application. The first video metadata is associated with a first user. The method further includes retrieving, from the database, second video metadata corresponding to the game state, the second video metadata associated with a second user. The method also includes initiating, based on a comparison of the first video metadata and the second video metadata, one or more gameplay enhancement operations at during the execution of the video game application.

Figure 21:
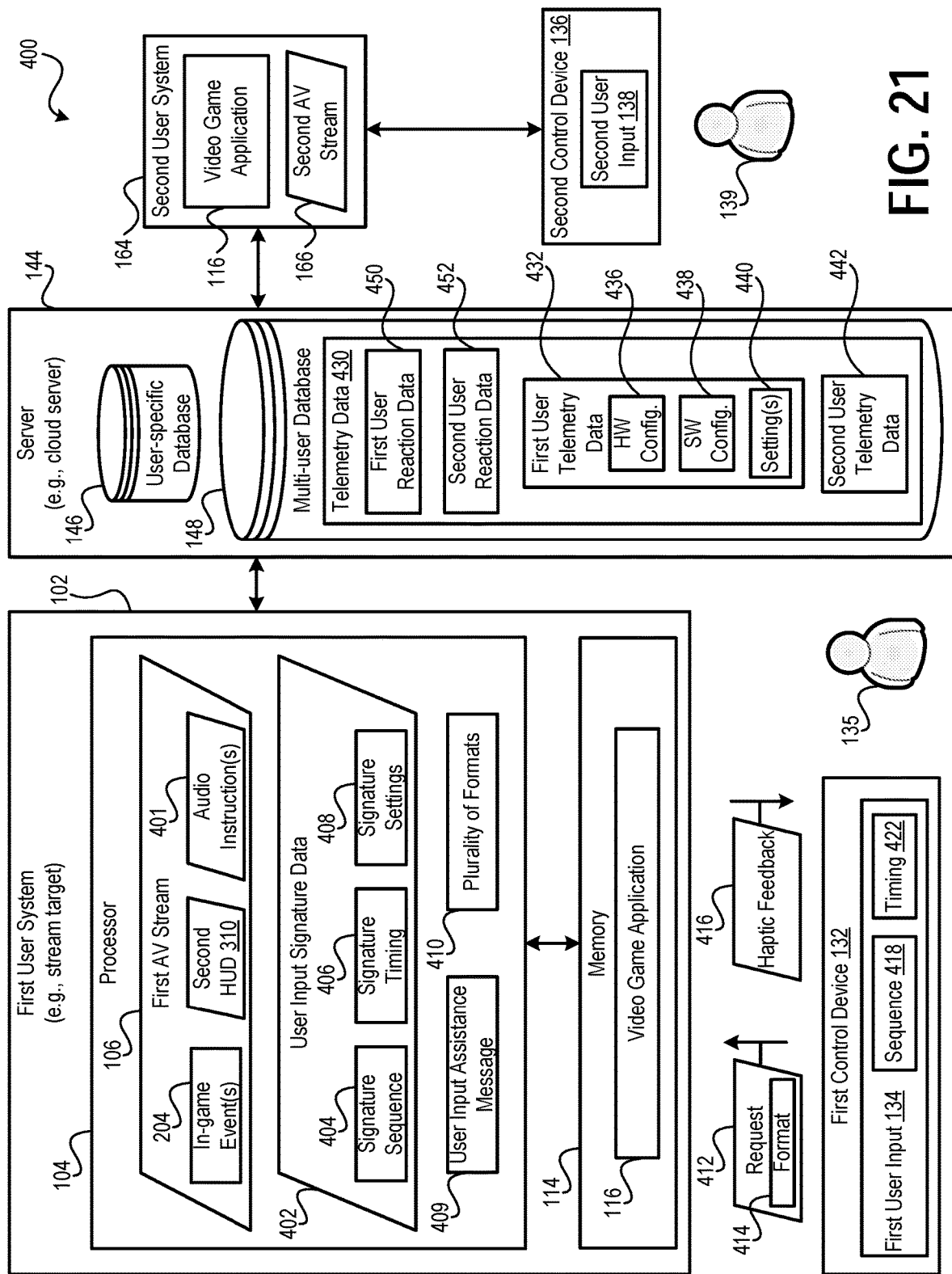
FIG. 21 illustrates another example of a system in accordance with some aspects of the disclosure.

Referring to FIG. 21, another illustrative example of a system is depicted and generally designated 400. In the example of FIG. 21, the system 400 includes one or more user systems, such as the first user system 102 and the second user system 164. The first user system 102 includes the processor 104 and the memory 114. The processor 104 is configured to retrieve the video game application 116 from the memory 114 and to execute the video game application 116 to generate an AV stream, such as the first AV stream 106. Depending on the implementation, the video game application 116 may correspond a single-user video game or a multi-user video game (e.g., as described with reference to certain aspects of FIG. 1).

During operation, the first user system 102 may monitor the first AV stream 106 to detect one or more in-game events, such as the one or more in-game events 204. In one example, monitoring the first AV stream 106 to detect the one or more in-game events 204 includes monitoring the one or more channels of audio data 202 of FIG. 11 using one or more examples described with reference to FIG. 11. Alternatively or in addition, monitoring the first AV stream 106 to detect the one or more in-game events 204 may include monitoring the HUD 304 of FIG. 15 using one or more examples described with reference to FIG. 15.

The first user system 102 may be configured to generate first user reaction data 450 associated with the one or more in-game events 204. The first user reaction data 450 may indicate one or more first reactions of the first user 135 to the one or more in-game events 204. In some implementations, the first user reaction data 450 includes information described with reference to FIG. 1, such as the biometric data 110, as an illustrative example.

Alternatively or in addition, the first user reaction data 450 may indicate one or more parameters of the first user input 134. For example, the first user reaction data 450 may indicate a sequence 418 of user input operations (e.g., a sequence of button pushes or keystrokes input to the first control device 132 by the first user 135) of the first user input 134. As another example, the first user reaction data 450 may indicate a timing 422 of user input operations (e.g., a timing of button pushes or keystrokes input to the first control device 132 by the first user 135) of the first user input 134.

The first user system 102 may store the first user reaction data 450 to a database, such as the multi-user database 148. The first user system 102 may retrieve, from the database (e.g., the multi-user database 148), second user reaction data 452 indicating one or more second reactions of the second user 139 to the one or more in-game events. To illustrate, the first user reaction data 450 and the second user reaction data 452 may indicate user focus (e.g., one or more of a viewpoint, gaze, or mouse operation), user motion, user action, or user sentiment.

The first user system 102 may be configured to perform a comparison of the first user reaction data 450 to the second user reaction data 452. The comparison may indicate a difference in reactions of the first user 135 and the second user 139. As an illustrative example, the first user system 102 may determine whether the first user reaction data 450 and the second user reaction data 452 indicate that the second user 139 is enjoying gameplay more than the first user 135, that the second user 139 is more relaxed during gameplay than the first user 135, or that the second user 139 exhibits better posture than the first user 135 during gameplay. As another example, the comparison may indicate that gameplay performance of the second user 139 is better than gameplay performance of the first user 135 (e.g., by comparing one or more parameters of the first user input 134 to one or more parameters of the second user input 138).

The first user system 102 may generate, based on the comparison of the first user reaction data 450 and the second user reaction data 452, a user input assistance message 409 for the first user 135 during the execution of the video game application 116. In some examples, the user input assistance message 409 includes or corresponds to the gameplay assistance message 308 of FIG. 15. To illustrate, in response to detecting that the first user input 134 results in a first performance rating for a game state (e.g., fails to result in a cleared level or a high score), the first user system 102 may access the multi-user database 148 to identify that the second user reaction data 452 is associated with a second performance rating for the game state that is greater than the first performance rating. The user input assistance message 409 may indicate one or more features or characteristics of the second user reaction data 452 resulting in improved performance as compared to the first user reaction data 450. The user input assistance message 409 may be presented to the first user 135 in real time or near-real time during gameplay of the video game application 116.

To further illustrate, in some examples, the user input assistance message is provided via one or more of a graphical overlay, such as a heads-up display (HUD) (e.g., the second HUD 310), via one or more audio instructions 401, or via haptic feedback 416 at the first control device 132. The second HUD 310 and the one or more audio instructions 401 may indicate button combinations, timing information, or other instructions to improve user input. The haptic feedback 416 may be presented directionally to "steer" user input by the first user 135. In some examples, the first control device 132 includes the haptic feedback device 250.

In some implementations, the user input assistance message 409 is generated automatically (e.g., without receiving a request from the first user 135). In another example, the first user 135 may initiate a request 412 for the user input assistance message 409 (e.g., in response to failing at a certain game level). In some implementations, the request 412 identifies a format 414. The format 414 may indicate whether the first user 135 is requesting a walk-through or real-time feedback, as illustrative examples. The format 414 may be matched to at least one format of a plurality of formats 410, and the user input assistance message 409 may be generated based on the at least one format (e.g., by selecting a walk-through or real-time feedback).

To further illustrate, in some examples, the user input assistance message 409 includes a "full walk-through" associated with a game (or a certain level or sequence of a game). During the full walk-through, gameplay control may be provided from the server 144 to the first user system 102 based on telemetry data stored by the server 144 (e.g., based on a representative sequence of buttons or other user input included in a particular I/O sequence, or based on a composite of I/O sequences of the "best" gameplay). The full walk-through may assist a user in a particularly challenging game, level, or sequence (for at least some types of games).

In some examples, the user input assistance message 409 includes an advertisement or other recommendation. For example, the user input assistance message 409 may include a prompt to learn more about a particular controller or other hardware device. As an example, the user input assistance message 409 may indicate that better performing players tend to use a particular piece of hardware (e.g., a mouse or a mechanical keyboard) that is not included in the first control device 132. The user input assistance message 409 may include a link to an online store to purchase the particular piece of hardware.

To further illustrate certain aspects of the disclosure, the server 144 may be configured to determine telemetry data 430 associated with user input from multiple users. For example, user input may be provided to the server 144 in accordance with a "crowd sourcing" technique. Each instance of user input provided to the server 144 may include an identification of an in-game event (e.g., an in-game event of the one or more in-game events 204) that is associated with the user input. Further, each instance of user input may include a score or ranking of the user input, such an indication of whether the user input cleared a game level or resulted in a high score, etc. In some examples, the score or ranking can be determined based on the one or more gameplay metrics 124 of FIG. 1.

The server 144 may be configured to determine user input signature data 402 based on the telemetry data 430. For example, the user input signature data 402 may indicate the signature sequence 404 of user input operations, such as a signature sequence of button pushes or keystrokes associated with an in-game event of the one or more in-game events 204. Alternatively or in addition, the user input signature data 402 may indicate the signature timing 406 of user input operations, such as a signature timing of button pushes or keystrokes associated with an in-game event of the one or more in-game events 204. In another example, the user input signature data 402 includes signature settings 408 associated with peripheral devices from which user input is received. The signature settings 408 may indicate a signature mouse sensitivity or other calibration metric, as an illustrative example. In one example, the server 144 is configured to send the user input signature data 402 to one or more user systems, such as the first user system 102.

In accordance with an aspect of the disclosure, the processor 104 is configured to monitor the first user input 134 to detect one or more signatures indicated by the user input signature data 402. The processor 104 may be configured to detect one or more in-game events (e.g., the one or more in-game events 204) based on the first user input 134 in response to determining that the first user input 134 (or a portion thereof) matches one or more signatures indicated by the user input signature data 402.

The processor 104 may be configured to monitor the first user input 134 by comparing the sequence 418 to the signature sequence 404 to detect the one or more in-game events 204. The processor 104 may be configured to monitor the first user input 134 by comparing the timing 422 to the signature timing 406 to detect the one or more in-game events 204.

In some examples, the first user system 102 is configured to access the multi-user database 148 in response to the first user input 134 to identify the telemetry data 430 (or a portion thereof). For example, the telemetry data 430 may include second user telemetry data 442 that is based on the second user input 138 from the second user 139, the second user reaction data 452, or both. The first user system 102 may be configured to access the second user telemetry data 442 in response to the first user input 134. The first user input 134 and the second user input 138 may correspond to the same game state or in-game event of the video game application 116.

In some examples, the telemetry data 430 indicates user inputs that are indexed by ranking or score. For example, the second user telemetry data 442 may indicate the second user input 138 and a ranking or score of the second user input 138 (e.g., whether the second user input 138 resulted in a cleared level or a high score). The ranking or score may correspond to or may be based on the second gameplay metric 122 of FIG. 1.

First user telemetry data 432 may be generated based on the first user input 134, the first user reaction data 450, or both. The first user telemetry data 432 may indicate parameters of the first user input 134 (e.g., the sequence 418 and the timing 422) and may further indicate a score or ranking of the first user input 134. In some examples, the score or ranking corresponds to or is based on the first gameplay metric 121 of FIG. 1.

In one example, the first user system 102 is configured to generate the first user telemetry data 432 and to send the first user telemetry data 432 to the server 144. In another example, the first user system 102 sends the first user input 134 to the server 144, and the server 144 generates first user telemetry data 432 based on the first user input 134. The server 144 may add the first user telemetry data 432 to the telemetry data 430.

The first user telemetry data 432 may indicate a hardware configuration 436 associated with the first user system 102, a software configuration 438 of the first user system 102, or a combination thereof. In an illustrative example, the hardware configuration 436 indicates a manufacturer of the first user system 102, a model number or type of the first user system 102, a model number or type of the first control device 132, a number of cores of the processor 104, a memory size of the memory 114, an amount of cache memory available to the processor 104, a clock speed of the processor 104, a number of millions of instructions per second (MIPS) executed by the processor 104, other hardware information, or a combination thereof. In some examples, the software configuration 438 indicates a type of operating system of the first user system 102, a version of an operating system of the first user system 102, a version of the video game application 116, other software information, or a combination thereof.

Alternatively or in addition, the first user telemetry data may indicate one or more settings 440 associated with the first control device 132. For example, the one or more settings 440 may include a mouse sensitivity of a mouse that is included in or that corresponds to the first control device 132.

In some examples, the first user telemetry data 432 is "normalized" based on configuration information, such as the hardware configuration 436, the software configuration 438, and the one or more settings 440. To illustrate, in some video games, certain hardware configurations 436, software configurations 438, or settings 440 may increase or decrease gameplay difficulty (as perceived by users). As a result, the first user telemetry data 432 may be "normalized" based on the configuration information (e.g., to enable an "apples to apples" comparison of the first user telemetry data 432 to the second user telemetry data 442).

In one example, normalizing the first user telemetry data 432 includes increasing a score or ranking indicated by the first user telemetry data 432. For example, the score or ranking may be decreased in response to a determination that a certain configuration decreases difficulty of gameplay. As another example, the score or ranking may be increased in response to a determination that a certain configuration increases difficulty of gameplay.

In some implementations, a remedial action is performed or recommended based on the telemetry data 430. For example, the server 144 or the first user system 102 may compare the one or more settings 440 to the one or more signature settings 408 and may determine, based on the comparison, whether the one or more settings 440 of the control device 132 should be modified. For example, a determination may be made that a mouse sensitivity associated with the first control device 132 should be modified. In response to determining that the one or more settings 440 should be modified, the server 144 or the first user system 102 may trigger a change to the one or more settings 440 (e.g., by issuing a control signal to change the one or more settings 440 or by presenting a prompt to the first user 135 suggesting modification of the one or more settings 440).

Figure 22:
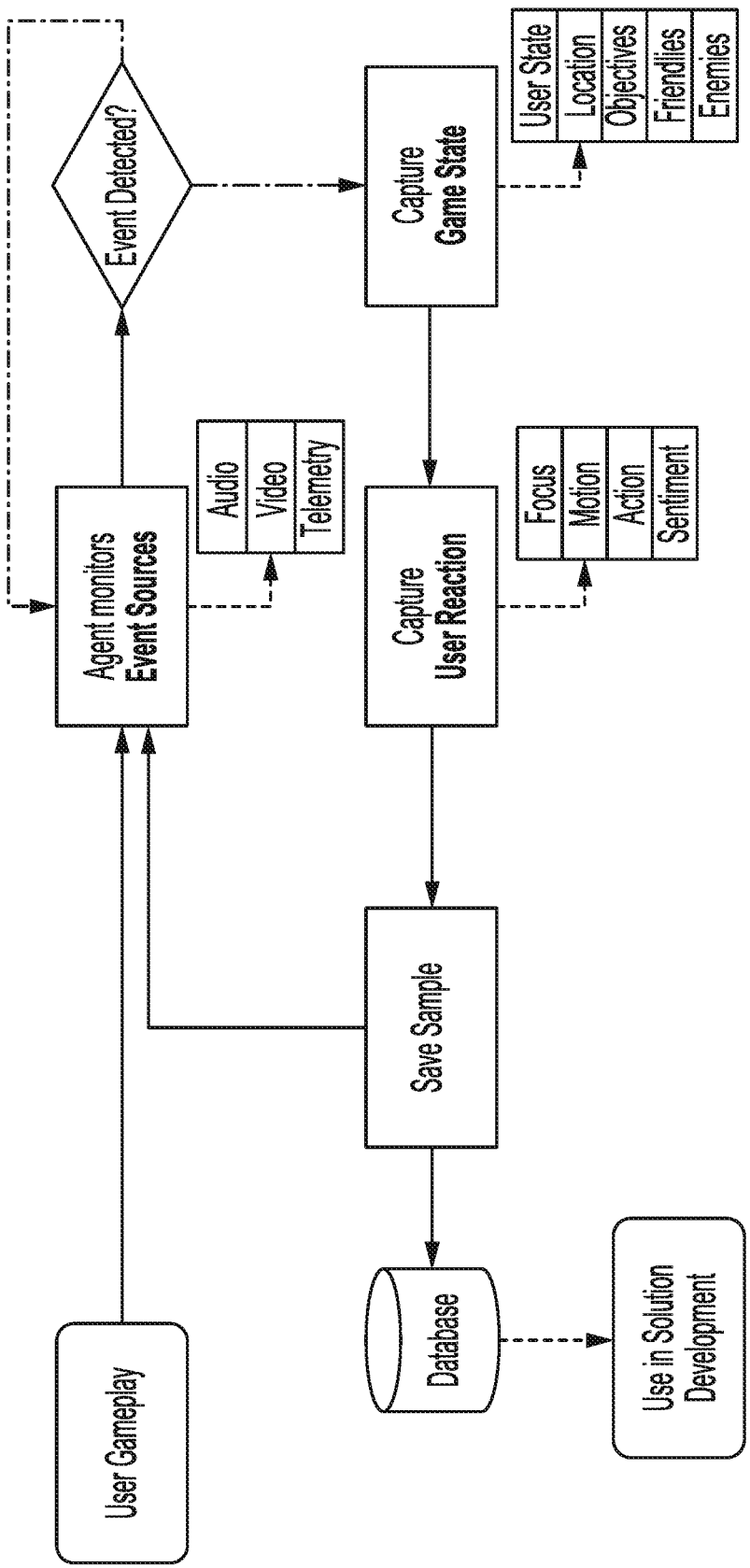
FIG. 22 illustrates examples of operations that may be performed by a device in accordance with some aspects of the disclosure.

FIG. 22 is a flow chart of a method in accordance with some aspects of the disclosure. The method of FIG. 22 includes monitoring event sources, such as audio data, video data, and telemetry data. The audio data may include the one or more channels of audio data 202. The video data may include the video portion 302, and the telemetry data may include the first user input 134, as illustrative examples. The event sources may be monitored by executing instructions (e.g., an "agent") by the processor 104.

In response to detecting an event (e.g., the one or more in-game events 204), a game state of the video game application 116 may be captured. The game state may indicate a user state, a location, a game objective, a friendly character, an enemy character, or other information. A user reaction to the game state may be captured. The user reaction may include an amount or target of focus of the first user 135, an amount or direction of motion of the first user 135, an action of the first user 135, or a sentiment of the first user 135.

Indications of the event, the game state, and the user reaction may be stored to a database, such as the multi-user database 148. In one example, the indications of the event, the game state, and the user reaction are included in the first user telemetry data 432.

FIG. 22 is a flow chart of another method in accordance with some aspects of the disclosure. In FIG. 22, audio sources are monitored to detect an event. For example, the one or more channels of audio data 202 may be monitored to detect the one or more in-game events 204. A game state is captured in response to detecting an event, such as by capturing an indication of an amount of character health, a location (e.g., a level), an objective, a number of friendly characters, and a number of enemy characters. Further, a user reaction to the game state may be captured, such as by detecting a reaction time of the first user 135. In the non-limiting example of FIG. 23, the reaction time is 300 milliseconds (ms).

Figure 23:
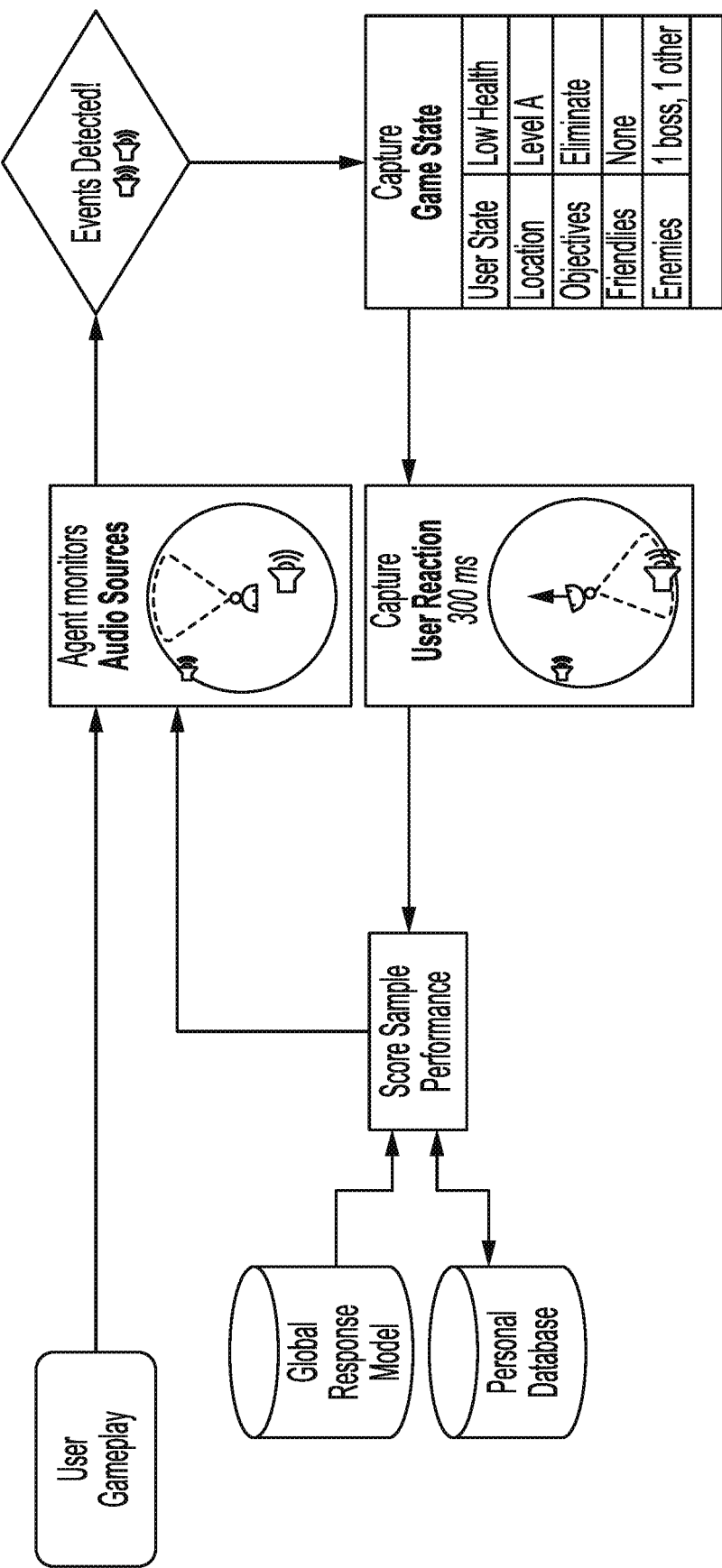
FIG. 23 illustrates additional examples of operations that may be performed by a device in accordance with some aspects of the disclosure.

FIG. 23 illustrates that gameplay performance may be scored (e.g., to generate the score or ranking described with reference to FIG. 21). In one example, the gameplay performance is scored by comparing the gameplay performance to other gameplay performances of other users (e.g., the users 139, 143) indicated by a "global" response model. The global response model may correspond to the multi-user database 148. Alternatively or in addition, the gameplay performance may be scored by comparing the gameplay performance to other gameplay performances of the first user 135 indicated by a personal database. The personal database may correspond to the user-specific database 146. After scoring the gameplay performance, the score may be stored to the global response model, to the personal database, or both.

In some examples, the global response model indicates a plurality of clips from gameplay associated with multiple players. The plurality of clips may include the clip 154 of FIG. 1. In some examples, the plurality of clips can be aggregated to create a compilation, such as a "greatest hits" collection. A compilation may be generated for a particular player, for a particular game, for a particular level or sequence of a game, or a combination thereof. For example, a compilation may include a plurality of clips from gameplay of different users at a certain level of a game. As another example, a compilation may include a plurality of clips from a single user corresponding to different attempts at a particular level or sequence or multiple levels or sequences.

FIG. 24 illustrates examples of content that may be stored in a database in accordance with some aspects of the disclosure. The database may correspond to the user-specific database 146, the multi-user database 148, the global response model of FIG. 23, or the personal database of FIG. 23.

The contents illustrated in FIG. 24 include event sources, such as audio data, video data, and telemetry data. The contents illustrated in FIG. 24 further include game state contents, such as user states, locations, objectives, friendly characters, and enemy characters. The contents further include user reactions, such as focus, motion, action, and sentiment.

To further illustrate, in one aspect of the disclosure, dynamic sample generation may be performed to "sample" gameplay performance of a user. Inputs to a sample generating device may include audio data, video (or visual) data, state data, or intensity of response. The state data may include player health (e.g., percentage, level, or effects), enemy state (e.g., health percentage, level, or effects), friendly position data (e.g., distance), or other enemy data (e.g., distance). The intensity of response may include a rate of reaction relative to a baseline response, speed of motion, a motion indication (e.g., erratic motion or controlled motion, button information, overshoot information, or multi-press information), biometrics, or sentiment change. The sample generating device may be configured to generate, based on the inputs, activity labels including a run activity label (e.g., towards, away, or ignore), a focus activity label (e.g., towards, away, or ignore), or an input activity level (e.g., buttons pressed or not pressed). An output of the sample generating device may include a training set with labels for recommending appropriate priority or response. The sample generating device may be included in a device, such as the first user system 102 or the server 144. The output may be included in the telemetry data 430.

Figure 25:
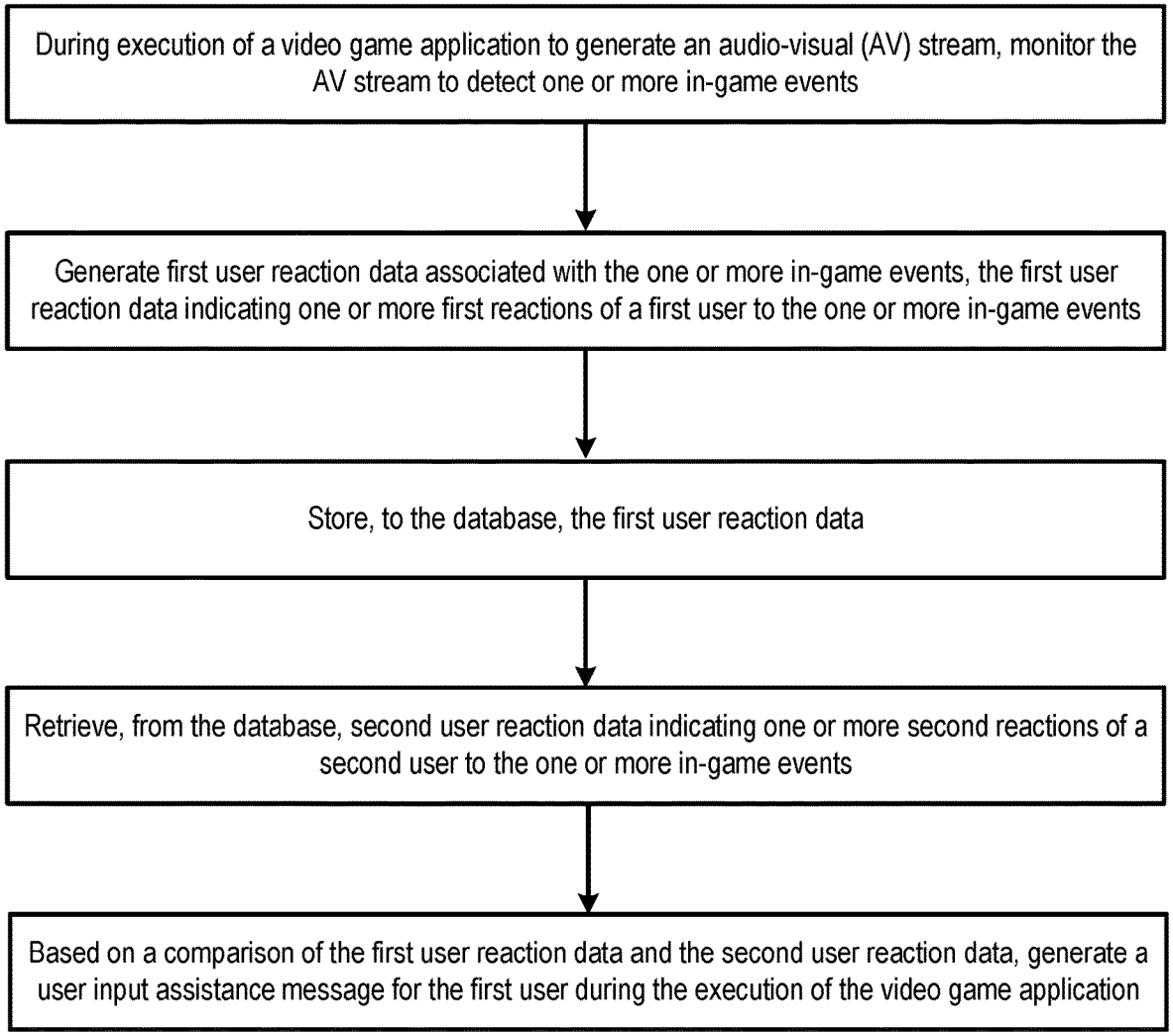
FIG. 25 illustrates an example of a method that may be performed by a device in accordance with some aspects of the disclosure.

FIG. 25 illustrates an example of a method in accordance with an aspect of the disclosure. Operations of the method of FIG. 25 may be performed by a device, such as by the first user system 102. In other examples, operations of the method of FIG. 20 may be performed by another device, such as the server 144. The method includes, during execution of a video game application to generate an audio-visual (AV) stream, monitoring the AV stream to detect one or more in-game events. The method further includes generating first user reaction data associated with the one or more in-game events. The first user reaction data indicates one or more first reactions of a first user to the one or more in-game events. The method further includes storing, to a database, the first user reaction data, and retrieving, from the database, second user reaction data indicating one or more second reactions of a second user to the one or more in-game events. The method also includes, based on a comparison of the first user reaction data and the second user reaction data, generating a user input assistance message for the first user during the execution of the video game application.

Although certain aspects of the disclosure are described separately for convenience, it is noted that the aspects can be combined without departing from the scope of the disclosure. To illustrate, a device (e.g., any of the user systems 102, 164, and 168, the server 144, or another device) may identify the one or more in-game events 204 by monitoring audio content (e.g., as described with reference to FIG. 11), by monitoring video content (e.g., as described with reference to FIG. 15), by monitoring user input (e.g., as described with reference to the example of FIG. 21), or a combination thereof. The one or more in-game events 204 (and information related to the one or more in-game events) may be stored at a database, such as the multi-user database 148, as described with reference to the example of FIG. 21. Information of the database may be accessed to trigger one or more gameplay enhancement operations, such as an automatic highlight capture operation (e.g., as described with reference to the clip 154 of FIG. 1), a dynamic screen aggregation operation (e.g., as described with reference to the example of FIG. 2), a dynamic position switch operation (e.g., as described with reference to the example of FIG. 3), a dynamic player switch operation (e.g., as described with reference to the example of FIG. 4), one or more lighting effects (e.g., as described with reference to the example of FIG. 5), a gameplay enhancement operation using one or more peripheral devices (e.g., as described with reference to the examples of FIG. 11, FIG. 15, or both), one or more other gameplay enhancement operations, or a combination thereof.

The schematic flow chart diagrams of FIGS. 7-10, 12-14, 20, and 25 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a system, server, controller, or other device may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors (e.g., the processor 104) are described throughout the detailed description, aspects of the invention may be executed on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
receiving first user reaction data associated with the one or more in-game events occurring during execution of a video game application to generate an audio-visual (AV) stream, the first user reaction data indicating one or more first reactions of a first user to the one or more in-game events;
storing, to a database, the first user reaction data;
retrieving, from the database, second user reaction data indicating one or more second reactions of a second user to the one or more in-game events; and
based on a comparison of the first user reaction data and the second user reaction data, generating a user input assistance message for the first user during the execution of the video game application.

2. The method of claim 1, further comprising monitoring the AV stream to detect one or more in-game events, wherein monitoring the AV stream to detect the one or more in-game events includes monitoring one or more channels of audio data of the AV stream.

3. The method of claim 1, further comprising monitoring the AV stream to detect one or more in-game events, wherein monitoring the AV stream to detect the one or more in-game events includes monitoring a heads-up display (HUD) of a video portion of the AV stream.

4. The method of claim 1, further comprising providing the user input assistance message to the first user in real time or near-real time during gameplay of the video game application.

5. The method of claim 1, wherein the user input assistance message is provided via one or more of a heads-up display (HUD), one or more audio instructions, or haptic feedback at a control device.

6. The method of claim 1, further comprising:
receiving a request for the user input assistance message during gameplay of the video game application, wherein the request identifies a format; and
matching the format to at least one format of a plurality of formats, wherein the user input assistance message is generated based on the at least one format.

7. The method of claim 1, wherein the one or more in-game events are detected based, at least in part, on first user input received from the first user, and further comprising:
generating first user telemetry data based on the first user input; and
storing the first user telemetry data to the database by adding the first user telemetry data to the database.

8. The method of claim 7, wherein the first user telemetry data indicates a hardware configuration associated with a first user system executing the video game application, a software configuration of the first user system, or a combination thereof.

9. The method of claim 7, wherein the first user input is received via a control device, and wherein the first user telemetry data indicates one or more settings of the control device.

10. The method of claim 9, further comprising:
performing a comparison of the one or more settings to one or more signature settings;
determining, based on the comparison, whether the one or more settings of the control device should be modified; and
in response to determining that the one or more settings should be modified, triggering a change to the one or more settings.

11. An information handling system, comprising:
a memory; and
a processor coupled to the memory, the processor configured to:
receive first user reaction data associated with the one or more in-game events occurring during execution of a video game application to generate an audio-visual (AV) stream, the first user reaction data indicating one or more first reactions of a first user to the one or more in-game events;
store, to a database, the first user reaction data;
retrieve, from the database, second user reaction data indicating one or more second reactions of a second user to the one or more in-game events; and
based on a comparison of the first user reaction data and the second user reaction data, generate a user input assistance message for the first user during the execution of the video game application.

12. The information handling system of claim 11, wherein the processor is further configured to monitor the AV stream to detect one or more in-game events by monitoring one or more channels of audio data of the AV stream to detect the one or more in-game events.

13. The information handling system of claim 11, wherein the processor is further configured to monitor the AV stream to detect one or more in-game events by monitoring a heads-up display (HUD) of a video portion of the AV stream to detect the one or more in-game events.

14. The information handling system of claim 11, wherein the processor is further configured to initiate providing the user input assistance message to the first user in real time or near-real time during gameplay of the video game application.

15. The information handling system of claim 14, wherein the user input assistance message is provided via one or more of a heads-up display (HUD), one or more audio instructions, or haptic feedback at a control device.

16. The information handling system of claim 11, wherein the processor is further configured to receive a request for the user input assistance message during gameplay of the video game application, the request identifying a format, to match the format to at least one format of a plurality of formats, and to generate the user input assistance message based on the at least one format.

17. A non-transitory computer-readable medium storing instructions executable by a processor to perform operations, the operations comprising:
during execution of a video game application, monitoring first user input to the video game application, the first user input associated with a first user;
in response to detecting that the first user input matches user input signature data, detecting one or more in-game events;
accessing a database to identify telemetry data associated with the one or more in-game events, the telemetry data based, at least in part, on second user input to the video game application from a second user different than the first user; and generating a user input assistance message for the first user based on the telemetry data.

18. The non-transitory computer-readable medium of claim 17, wherein the one or more in-game events are detected based, at least in part, on first user input received from the first user, and wherein the operations further include:
generating first user telemetry data based on the first user input; and
storing the first user telemetry data to the database by adding the first user telemetry data to the database.

19. The non-transitory computer-readable medium of claim 18, wherein monitoring the AV stream to detect the one or more in-game events includes monitoring one or more channels of audio data of the AV stream.

20. The non-transitory computer-readable medium of claim 18, wherein monitoring the AV stream to detect the one or more in-game events includes monitoring a heads-up display (HUD) of a video portion of the AV stream.

* * * * *